(12) United States Patent
Nielsen

(10) Patent No.: US 6,199,080 B1
(45) Date of Patent: *Mar. 6, 2001

(54) METHOD AND APPARATUS FOR DISPLAYING INFORMATION ON A COMPUTER CONTROLLED DISPLAY DEVICE

(75) Inventor: Jakob Nielsen, Atherton, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/708,166

(22) Filed: Aug. 30, 1996

(51) Int. Cl.[7] ........................................ G06F 17/21
(52) U.S. Cl. .......................... 707/513; 707/503; 707/509
(58) Field of Search ............................. 345/440; 707/501, 707/512, 513, 521, 503, 504, 509, 510

(56) References Cited

U.S. PATENT DOCUMENTS

| | | | |
|---|---|---|---|
| 5,142,669 | * | 8/1992 | Inoue et al. ........................ 395/157 |
| 5,253,362 | * | 10/1993 | Nolan et al. ........................ 707/512 |
| 5,579,462 | * | 11/1996 | Barber et al. ...................... 345/440 |
| 5,581,677 | * | 12/1996 | Myers et al. ....................... 345/440 |
| 5,664,084 | * | 9/1997 | Smith ................................. 345/440 |
| 5,666,542 | * | 9/1997 | Katai et al. ........................ 707/512 |
| 5,689,717 | * | 11/1997 | Pritt .................................... 707/512 |
| 5,734,888 | * | 3/1998 | Li et al. ............................. 345/440 |
| 5,737,739 | * | 4/1998 | Shirley et al. ..................... 707/512 |
| 5,745,110 | * | 4/1998 | Ertemalp ........................... 345/440 |
| 5,784,067 | * | 7/1998 | Ryll et al. .......................... 345/440 |
| 5,790,435 | * | 8/1998 | Lewis et al. ..................... 707/503 X |
| 5,794,178 | * | 8/1998 | Caid et al. ......................... 345/440 |
| 5,809,318 | * | 9/1998 | Rivette et al. ..................... 707/512 |

OTHER PUBLICATIONS

Quattro Pro 4.0 User's Guide, Borland International, pp. 267–269, 1992.*

Using FrameMaker, FrameMaker Windows and MacIntosh Release 5, Frame Technology Corporation, May 1995, pp. 6–11 and 6–12.

User's Guide "Microsoft Word, The World's Most Popular Word Processor", Chapter 13, Working with Tables, p. 305, Document No. WB60460–0794.

User's Guide "Microsoft Excel", Part 4, Organizing and Managing Data in a List, p. 388, Document No. XL57926–0694.

Tables As Implemented in Netscape 1.1, Netscape 1.1 Tables and the Proposed HTML 3.0 Spec, URL http://webreference.com/html3and ns/table.html, Revised: Apr. 14, 1996, 28 pages.

HTML Tables, Network Working Group, D. Raggett, URL http://andrew2.andrew.cmu.edu/r/c1942.html, May 1996, 26 pages.

Hypertext Markup Language–2.0, Network Working Group, T. Berners–Lee, MIT, D. Connollu, Nov. 1995, 71 pages.

* cited by examiner

Primary Examiner—Joseph H. Feild
(74) Attorney, Agent, or Firm—McDermott, Will & Emery

(57) ABSTRACT

Apparatus, methods, systems and computer program products are disclosed to provide a display of structured information on a computer controlled display device such that the supplemental information used to describe the primary data displayed is always available to be seen by a user. This supplemental information continues to be displayed as the user scrolls or pages through the primary information even if the structured information is embedded in a scrolling context.

32 Claims, 22 Drawing Sheets

|            | 1990 | 1991 | 1992 |
|------------|------|------|------|
| California | 1    | 2    | 3    |
| Indiana    | 4    | 5    | 6    |
| New York   | 7    | 8    | 9    |

*Figure 1a*

(Prior Art)

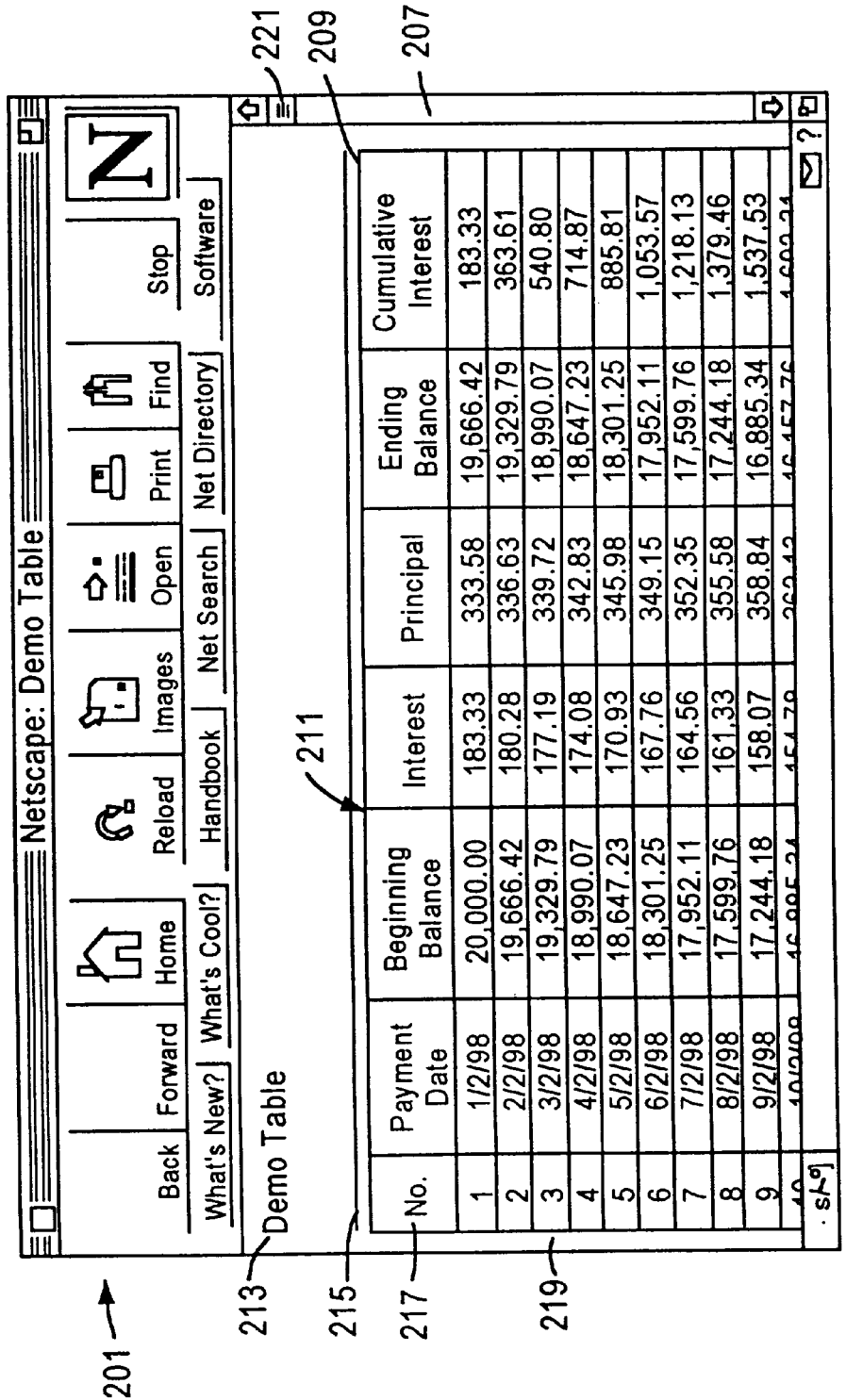
Figure 2a(1)
(PRIOR ART)

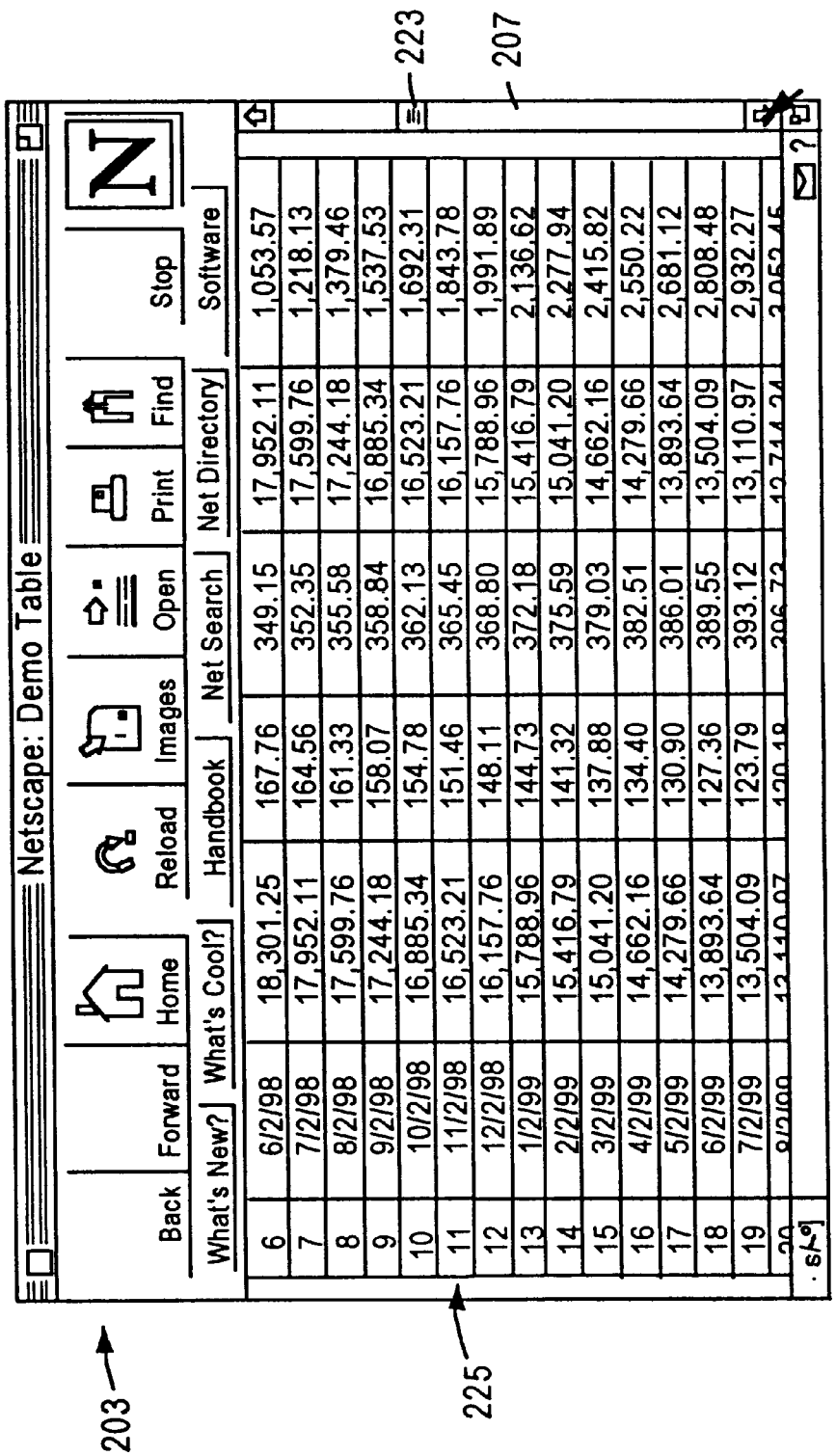
Figure 2a(2)
(PRIOR ART)

| | What's New? | What's Cool? | Handbook | Net Search | Net Directory | Software |
|----|----|----|----|----|----|----|
| 37 | 1/2/01 | 5,848.62 | 53.61 | 463.30 | 5,385.32 | 4,511.01 |
| 38 | 2/2/01 | 5,385.32 | 49.37 | 467.55 | 4,917.77 | 4,560.37 |
| 39 | 3/2/01 | 4,917.77 | 45.08 | 471.83 | 4,445.94 | 4,605.45 |
| 40 | 4/2/01 | 4,445.94 | 40.75 | 476.16 | 3,969.79 | 4,646.20 |
| 41 | 5/2/01 | 3,969.79 | 36.39 | 480.52 | 3,489.27 | 4,682.59 |
| 42 | 6/2/01 | 3,489.27 | 31.98 | 484.93 | 3,004.34 | 4,714.58 |
| 43 | 7/2/01 | 3,004.34 | 27.54 | 489.37 | 2,514.97 | 4,742.12 |
| 44 | 8/2/01 | 2,514.97 | 23.05 | 493.86 | 2,021.11 | 4,765.17 |
| 45 | 9/2/01 | 2,021.11 | 18.53 | 498.38 | 1,522.73 | 4,783.70 |
| 46 | 10/2/01 | 1,522.73 | 13.96 | 502.95 | 1,019.78 | 4,797.66 |
| 47 | 11/2/01 | 1,019.78 | 9.35 | 507.56 | 512.22 | 4,807.01 |
| 48 | 12/2/01 | 512.22 | 4.70 | 512.22 | 0.00 | 4,811.70 |

End of example

Figure 2a(3)
(PRIOR ART)

| No. | Payment Date | Beginning Balance | Interest | Principal | Ending Balance | Cumulative Interest |
|---|---|---|---|---|---|---|
| 1 | 1/2/98 | 20,000.00 | 183.33 | 333.58 | 19,666.42 | 183.33 |
| 2 | 2/2/98 | 19,666.42 | 180.28 | 336.63 | 19,329.79 | 363.61 |
| 3 | 3/2/98 | 19,329.79 | 177.19 | 339.72 | 18,990.07 | 540.80 |
| 4 | 4/2/98 | 18,990.07 | 174.08 | 342.83 | 18,647.23 | 714.87 |
| 5 | 5/2/98 | 18,647.23 | 170.93 | 345.98 | 18,301.25 | 885.81 |
| 6 | 6/2/98 | 18,301.25 | 167.76 | 349.15 | 17,952.11 | 1,053.57 |
| 7 | 7/2/98 | 17,952.11 | 164.56 | 352.35 | 17,599.76 | 1,218.13 |
| 8 | 8/2/98 | 17,599.76 | 161.33 | 355.58 | 17,244.18 | 1,379.46 |
| 9 | 9/2/98 | 17,244.18 | 158.07 | 358.84 | 16,885.34 | 1,537.53 |

Figure 13a(1)

Netscape: Demo Table

| No. | Payment Date | Beginning Balance | Interest | Principal | Ending Balance | Cumulative Interest |
|---|---|---|---|---|---|---|
| 8 | 8/2/98 | 17,599.76 | 161.33 | 355.58 | 17,244.18 | 1,379.46 |
| 9 | 9/2/98 | 17,244.18 | 158.07 | 358.84 | 16,885.34 | 1,537.53 |
| 10 | 10/2/98 | 16,885.34 | 154.78 | 362.13 | 16,523.21 | 1,692.31 |
| 11 | 11/2/98 | 16,523.21 | 151.46 | 365.45 | 16,157.76 | 1,843.78 |
| 12 | 12/2/98 | 16,157.76 | 148.11 | 368.80 | 15,788.96 | 1,991.89 |
| 13 | 1/2/99 | 15,788.96 | 144.73 | 372.18 | 15,416.79 | 2,136.62 |
| 14 | 2/2/99 | 15,416.79 | 141.32 | 375.59 | 15,041.20 | 2,277.94 |
| 15 | 3/2/99 | 15,041.20 | 137.88 | 379.03 | 14,662.16 | 2,415.82 |
| 16 | 4/2/99 | 14,662.16 | 134.40 | 382.51 | 14,279.66 | 2,550.22 |
| 17 | 5/2/99 | 14,279.66 | 130.90 | 386.01 | 13,893.64 | 2,681.12 |
| 18 | 6/2/99 | 13,893.64 | 127.36 | 389.55 | 13,504.09 | 2,808.48 |
| 19 | 7/2/99 | 13,504.09 | 123.79 | 393.12 | 13,110.97 | 2,932.27 |

Figure 13a(2)

| No. | Payment Date | Beginning Balance | Interest | Principal | Ending Balance | Cumulative Interest |
|---|---|---|---|---|---|---|
| 39 | 3/2/01 | 4,917.77 | 45.08 | 471.83 | 4,445.94 | 4,605.45 |
| 40 | 4/2/01 | 4,445.94 | 40.75 | 476.16 | 3,969.79 | 4,646.20 |
| 41 | 5/2/01 | 3,969.79 | 36.39 | 480.52 | 3,489.27 | 4,682.59 |
| 42 | 6/2/01 | 3,489.27 | 31.98 | 484.93 | 3,004.34 | 4,714.58 |
| 43 | 7/2/01 | 3,004.34 | 27.54 | 489.37 | 2,514.97 | 4,742.12 |
| 44 | 8/2/01 | 2,514.97 | 23.05 | 493.86 | 2,021.11 | 4,765.17 |
| 45 | 9/2/01 | 2,021.11 | 18.53 | 498.38 | 1,522.73 | 4,783.70 |
| 46 | 10/2/01 | 1,522.73 | 13.96 | 502.95 | 1,019.78 | 4,797.66 |
| 47 | 11/2/01 | 1,019.78 | 9.35 | 507.56 | 512.22 | 4,807.01 |
| 48 | 12/2/01 | 512.22 | 4.70 | 512.22 | 0.00 | 4,811.70 |

End of example

Figure 13a(3)

METHOD AND APPARATUS FOR DISPLAYING INFORMATION ON A COMPUTER CONTROLLED DISPLAY DEVICE

BACKGROUND OF THE INVENTION

1. Field of the Invention

This invention relates to the field of information display technology. Specifically, this invention is a new and useful method, apparatus, system and computer program product configured to display structured information to a user on a computer controlled display device.

2. Background

Information is often presented in tabular or graphical form to show relationships present in the information. Information provided in tabular form is presented within the structure of rows and columns. An intersection of a row and column defines a cell that can contain information. This row-column format provides a two dimensional characterization of the information stored in each cell. Thus, the rows may be organized to "categorize" the information within the cells, and the columns organized to show the "type" of information contained within the cells. The terms "categorize" and "type" are simply convenient labels to identify different ways of classifying the information. Often the cells in the first row and first column of the table contain supplemental information that describe the category and type of the information stored in the remaining cells (the body cells). A typical table is illustrated in FIG. 1a. A table 101 has a header 103, a leftside 105, and a plurality of body cells 107. The information in the header 103 indicates the categories of the data within the body cells 107. Here the categories are "1990", "1991", and "1992". The information in the leftside 105 cells indicates the type of data within the body cells 107. Here the type of data is related to "California", "New York", and "Indiana". Hence, the value of the "Indiana" data for 1991 is '5' because the value contained in a cell 109 defined by the intersection of the row labeled as "Indiana" and the column labeled as "1991" is 5. The category and type information is supplemental to the primary information stored in the body cells of the table. Thus the information in the table is structured in that the information includes supplemental and primary information.

Graphs are also used to show informational relationships. In this case the information is presented to a user in a graphical form. FIG. 1b illustrates an example graph representing the information contained in FIG. 1a. A graph 121 includes an X-axes 123 and a Y-axis 125. For this graph 121, the Y-axis 125 indicates the magnitude of the values of the datapoints (here corresponding to the data stored in the body cells 107 of the table 101 in FIG. 1a). The X-axis 123 is labeled with the categories of the data. A legend 127 associates each of a plurality of bars 129 with a type of information. Thus the legend 127 shows that the data values for "Indiana" are associated with a plurality of bars 131, one for each category of data. As in the table 101, the information in a graph is structured and contains both supplemental and primary information.

A problem when displaying large tables and graphs is that the information to be displayed often cannot be completely presented (in a useful form) to a user in the drawing area available on a computer display. This problem is often addressed by scrolling and/or paging the information displayed. Paging replaces the currently displayed information with an adjacent "page" of information. Scrolling repetitively and incrementally moves the existing displayed information in a scroll direction and adds new information to the display such that the information appears to move smoothly on the display. Thus, when a table or graph is scrolled or paged to view portions of the information that would not fit in the drawing area of the display, supplemental information (such as a table header or a graphic axis label) is often moved out of the drawing area and out of the user's view. This requires the user to remember what supplemental information is associated with the information that is displayed. This becomes very difficult after a series of scroll or page operations.

When tables are presented on paper, many applications print the supplemental information on each page when the table body extends across pages. This allows the reader to reference the categories and types of the data printed in the table's body cells on each page. Thus, the prior art knows of repeating table headers on each printed page of a multi-page table. This functionality is provided in many "what-you-see-is-what-you-get" (WYSIWYG) applications such as Adobe's Framemaker® and Microsoft's Word® (see Using FrameMaker, part number 41-04699-00, page 6-11, from Frame Technology Corporation and Microsoft Word User's Guide, document number WB60460-0794, page 305). In Microsoft Word the supplemental information is first selected by the user and then flagged as a header (a header being classified as supplemental information). In FrameMaker, the table facility provides explicit header, footer, and title areas depending on which table format the user selects. These header, footer and title areas contain information supplemental to the primary information contained in the body cells of the table. These applications only display the supplemental information on a computer display when in a "page view" mode (thus duplicating the formatting of a page of paper on a computer display). The difficulty with this approach is that the supplemental information is presented for each page, thus when multiple pages are presented on the display the supplemental information is duplicated occupying space otherwise available for the display of the primary information. Additionally, the supplemental information changes position on the display as the user scrolls across a page boundary. (For example, as header information at the top of one page is scrolled out of the drawing area a duplicate of the header information may appear at the bottom of the drawing area—at the top of the new page that is scrolled into the display.)

Another approach, taken by Microsoft Excel®, provides a facility for segmenting a displayed spreadsheet and of "freezing" the segments. Thus, the user can manually segment the spreadsheet and freeze the segmented panes such that supplemental information within a frozen pane is always displayed. This approach has only limited applicability when the table is not the entire document. Many documents also contain text and illustrations before, after and around a table. Further, some documents include tables within tables. For these types of general documents there is little utility in maintaining visibility of a single segment.

The above methods also involve an explicit user or page layout command to identify the supplemental information that is to be presented to the user. However for sorting purposes, Microsoft Excel automatically determines the header information (a limited type of supplemental information) of a table. Excel identifies column labels by comparing the characteristics of the information in the first row of data with the information in subsequent rows. This process is briefly described in the Microsoft Office User's Guide, version 5.0, copyright 1993–1994, document no. XL57926-0694, page 388.

Generally, these WYSIWYG applications do not provide a mechanism for displaying supplemental information (such as axis labels, titles, or legends) from a graph. However, graphs share some display characteristics with tables. For example graphs can be larger than the drawing area available to display them. Thus, supplemental information that exists on a graph is often scrolled off the drawing area of a computer driven display.

Although paper based WYSIWYG applications provide a way of displaying supplemental information on tangible media, these applications do not provide a satisfactory solution to the problem of maintaining supplemental information on a limited drawing area of a computer controlled display device. The fundamental concept of a WYSIWYG application is that the author of a document sees a true representation on the computer display of how the document will look when actually printed. Thus the data describing a WYSIWYG document (the data in accordance with a specific document markup language) is designed to create the same image regardless of the device used to present the document (printer and display devices). However, some applications are designed to present information to a user primarily through a computer controlled display device instead of on paper. Unlike paper, that has a limited number of standard sizes, computer displays are available in a wide range of sizes and resolutions. Thus the data used to define a presentation of information on a wide variety of computer displays generally is less constrained than the data used to define a WYSIWYG document. That is, that the information to be displayed is described in a manner appropriate to the device intended to be used to present the information. In the case of computer display devices, the document layout process is often delegated to an application program executing in a computer controlling the user's display. The information provided by an internet server to an internet client often has this characteristic. In particular, the world wide web (WWW) generally uses documents described according to the hypertext markup language (HTML) specification briefly discussed below.

FIG. 2a illustrates a prior art display of a document, containing of a large table, in a limited drawing area. Each of a plurality of screen images 201, 203, and 205 have a user selectable control area used as a scroll control 207. This scroll control 207 is used to position the display of data within the document. In the first screen image 201 a top edge 209 of a table 211 is displayed below a line of text 213 and a horizontal rule 215. The cells that comprise a first row 217 of the table 211 contain supplemental information that categorizes the primary information contained in a plurality of body cells 219 of the table 211. The scroll control 207 of the screen image 201 contains a thumb 221. This thumb 221 allows a user to position the document in the display. The position of the thumb 221 in the scroll control 207 also indicates that the beginning of the document is displayed. In contrast, the position of a thumb 223 in the scroll control 207 on the screen image 203 indicates that the document has been repositioned (scrolled, paged or otherwise). Because the document has been repositioned, the first row of the table (the supplemental information) is no longer presented on the display. Thus, only the primary information contained in the body cells 225 is displayed. Finally, the screen image 205 shows that the position of a thumb 227 in the scroll control 207 indicates the document has been repositioned to its end. The thumbs 221, 223, and 227 are all the same selectable control area but positioned differently to indicate the position of the document in the drawing area.

FIG. 2b also illustrates the prior art method to scroll the context of a document. A screen image 231 contains a first drawing area 233, a second drawing area 235 and a table drawing area 237 containing a table 239 that is partially displayed. To help indicate the position of the table 239 in the drawing area 237, the table 239 contains supplemental information and the letters "A" through "Z". The screen image 231 is only large enough to display the top of the table 239, thus only letters "A" through "G" are displayed. The table 239 is partially displayed because the table drawing area 237 is too small to contain the entire table 239. Thus, the portion of the table 239 that exists below the table drawing area 237 at a bottom boundary 241 is not displayed. The table 239 also includes a supplemental information 243 located at the top of the table. The screen image 231 includes a selectable control area 245 containing a thumb 247 that both allows a user to scroll the display by manipulating the thumb 247 on the selectable control area 245 and indicates the scrolling position of the document by the position of the thumb 247 on the selectable control area 245.

FIGS. 2c and 2d illustrate the appearance of the screen 231 display when presenting different portions of the document. FIG. 2c illustrates the appearance of the screen 231 after the document has been scrolled upwards but not so far as to display the end of the document. Now the drawing areas of FIG. 2b 233, 235, and 237 have been shifted upwards. The table 239 displayed in the drawing area 237 extends above a top boundary 249 and, as in FIG. 2b, extends below the bottom boundary 241. The supplemental information 243 displayed in FIG. 2b is not displayed in FIG. 2c because it has been scrolled above the top boundary 249. The primary data of the table 239 now displays "B" through "J" in the table drawing area 237. The new scroll position is indicated by the position of a thumb 251 on the selectable control area 245. Thumbs 247 and 251 are the same selectable control area, but in different positions in FIGS. 2b and 2c indicating different scroll positions. The scroll operation scrolls both the context containing the table and the table 239.

FIG. 2d illustrates the appearance of the screen 231 after the document is positioned at its end. Now the drawing areas of FIG. 2b 233, and 235 have been shifted completely off the display device. The table drawing area 237 now contains the last portion of the table information (here the "W" through "Z"). The table 239 extends above the top boundary 249. The end of the table (the bottom edge of the table) is at a bottom edge 253. Again the position of a thumb 255 on the selectable control area 245 indicates the current scroll position.

FIGS. 2a–d indicate some of the problems with scrolling a document having tabular information within a context. These problems are, among others, that supplemental information associated with the table can be scrolled off the display; and that information displayed in the context containing the tabular information can also be scrolled off the display. These and similar problems also apply to documents containing a graph.

World Wide Web

The WWW is a massive hypertext system that a user accesses using a WWW browser application executing on a computer—an information access apparatus. The WWW browser apparatus communicates with, and is a client of, information provider apparatus such as server computers each executing server applications capable of communicating with the client browser application. These clients obtain information and services, in the form of web pages, from the server. These web pages are identified by unique universal resource locators (URL) and are usually specified using a markup language—generally a version of the hypertext markup language (HTML) briefly described below.

The background of the WWW, WWW browser applications, and URLs are well described by reference to the first chapter of Instant HTML Web Pages, by Wayne Ause, Ziff-Davis Press, ISBN 1-56276-363-6, copyright 1995, pages 1–15, hereby incorporated by reference as illustrative of the prior art.

FIG. 3 illustrates how a plurality of computers implement a client-server information access system. One skilled in the art will understand that the invention does not depend on the existence of a client-server information access mechanism because information to be displayed to a user often resides on the same computer that accesses the information. An information client system 301 communicates over a network 303 such as the internet 303 to a plurality of information server systems 305. The client system 301 encapsulates requests for services and information within an applicable internet protocol and passes the encapsulated requests to the internet 303 as indicated by an arrow 307. The internet 303 routes these requests to each of the plurality of information server systems 305 addressed within the request as indicated by a plurality of arrows 309. Each of the plurality of addressed information server systems 305 respond to the client system 301 with responses appropriate to the service or information requested by the client system 301. Once the client system 301 receives this information it is presented to the user by using an application program (for example, a WWW browser) executing on the client computer.

HTML is used to describe hypertext documents that can be presented to a user by an application. The application processes HTML data to generate an image that can be displayed to a user on a computer display or tangible page. Unlike page description languages, such as PostScript, the "page" layout of HTML documents is dependent on the drawing area used to display the HTML. Thus, HTML is used to describe hypertext documents that are portable from one computing platform to another and that do not need WYSIWYG functionality. The HTML concept is that of a scrolling page that can be resized as desired by the user. Thus, HTML based applications do not strive to achieve WYSIWYG functionality, but rather they strive to appropriately present information in drawing areas of different sizes and resolutions. Thus, an application that displays HTML data will use whatever drawing area is available to render the HTML to best fit that given drawing area. To perform this function the application will automatically wrap lines, adjust the width and height of table cells and perform other drawing area dependent operations to best display the HTML document in the given drawing area.

HTML 2.0, is described in RFC1866 and can be found on the WWW at: "http://www.cis.ohio-state.edu/htbin/rfcl/rfc1866.html". HTML 2.0 does not provide for tables. However, HTML variants have provided table support. In particular, HTML 3.2, found at "http://www.w3.org/pub/WWW/MarkUP/Wilbur/features.html", RFC1942 found at "http://www.cis.ohio-state.edu/htbin/rfc/rfc1942.html", and the Netscape 1.1 table specification found at "http://home.netscape.com/assist/net$_{31}$ sites/tables.html".

HTML versions 1 and 2 did not provide support for tables or graphs (although graphs could be presented as an image). However, HTML table capability was included in version 1.1 of the Netscape browser. The HTML 3.0 proposal, that included extensive table support, was abandoned by Jul. 9, 1996, and discussion initiated regarding HTML 3.2. HTML 3.2 retreated from the HTML 3.0 generalized table specification and proposed a much simpler version. However, RFC1942 requested discussion and suggestions regarding a more extensive HTML table specification. Thus, the capability of table features for current and future versions of HTML is unclear. However, current HTML usage places table header information within <TH></TH>tags.

Regardless of what standard is eventually adopted, those creating HTML will often not specify supplemental information for tables or graphs for reasons that extend from limited awareness of HTML to limited time to create a HTML document. Thus, WWW browsers that can automatically detect, extract and display supplemental information from tables and graphs are preferred over those limited to detecting and displaying only explicit supplemental information such as delimited by <TH></TH>tags.

Supplemental information is generally provided at the edges of a table. That is, cells on the top and bottom rows; and the left and right columns—the boundary cells. This supplemental information is generally different (thus distinguishable) from the primary information contained in the body of the table. Where the primary information may be numerical, the supplemental data may be text; where the primary information is text, the supplemental information is generally formatted differently so as to stand out from the primary information. In a graph, the supplemental information is generally positioned along an axis and/or floating outside the bounds of the graph (such as a legend or title) and are also distinguishable from the primary information. These characteristics of tabular and graphical supplemental information lend themselves to heuristic detection, classification and extraction of the supplemental data from a table or graph when the supplemental data is not explicitly defined.

Although the invention applies to information display apparatus in general, WWW browser applications executing on a computer are representative of the technology. As such, the following describes the invention within the context of a preferred embodiment of a WWW browser application. However, one skilled in the art will understand that the invention generally can be applied to applications and apparatus that present tabular or graphical data (or other data having a supplemental part and a primary part) to a user on a computer controlled display device. Further, one skilled in the art will understand that the problem exists for any large amount of tabular or graphical data that is presented to a user on a limited size display. Thus, for example but without limitation, spreadsheets, word processing, and presentation applications have a need satisfied by the invention.

SUMMARY OF THE INVENTION

The present invention provides an economical, apparatus, method, system and computer program product for providing enhanced facilities to users of computer controlled display devices. The invention optimizes the display of tables, graphics and similar structured information to such a user. One aspect of the invention is a computer controlled method for displaying structured information to a user of a computer controlled display device. The structured information includes a plurality of primary information and a supplemental information. The method determines that one or more but not all of the plurality of primary information will be presented on the display device. This primary information has an attached edge relating to said supplemental information. The method also locates the supplemental information within the structured information. The method then displays a selection of primary information from the plurality of primary information (comprising ore or more of the plurality of primary information) within a drawing area on the display device. The method also displays the supplemental information within this drawing area. The position where the supplemental information is displayed in the drawing area depends on the attached edge. The displayed supplemental information corresponds to the selection of primary information that is displayed.

In another aspect of the invention, an information display system is disclosed that displays structured information to a user of on a computer controlled display device. This structured information includes a plurality of primary information and a supplemental information. The system includes a determination mechanism that determines that one or more but not all of the plurality of primary information (having an attached edge relating to the supplemental information) is to be presented on the display device. The system also includes a detection mechanism that locates the supplemental information within said structured information. Finally the system includes a display mechanism that displays a selection of primary information (this selection comprising one or more of the plurality of primary information) along with the supplemental information within a drawing area on the display device. The supplemental information is positioned within the drawing area depending on the attached edge. As above, the displayed supplemental information corresponds to the selection of primary information.

Yet another aspect of the invention discloses an information display apparatus for displaying structured information, on a display device, to a user. This information display apparatus has a central processing unit, a memory, and the display device. The apparatus includes a determination mechanism that determines that one or more but not all of the plurality of primary information (having an attached edge relating to the supplemental information) is to be presented on the display device. The apparatus also includes a detection mechanism that locates the supplemental information within said structured information. Finally the system includes a display mechanism that displays a selection of primary information (this selection comprising one or more of the plurality of primary information) along with the supplemental information within a drawing area on the display device. The supplemental information is positioned within the drawing area depending on the attached edge. As above, the displayed supplemental information corresponds to the selection of primary information.

Yet a final aspect of the invention is a computer program product embedded on a computer usable medium for causing a computer to discloses a computer program product having computer readable code embodied in a computer usable storage medium. When executed on a computer, the computer readable code causes a computer to effect a determination mechanism, a detection mechanism, and a display mechanism having the same functions as the apparatus described above.

The foregoing and many other objects and advantages of the present invention will no doubt become obvious to those of ordinary skill in the art after having read the following detailed description of the preferred embodiments which are illustrated in the various drawing figures.

DESCRIPTION OF THE DRAWINGS

FIGS. 2*a–d* illustrate prior art scrolling of information on a display device;

FIGS. 13*a–e* illustrate the results of the operation of the invention in accordance with a preferred embodiment.

DESCRIPTION OF THE PREFERRED EMBODIMENTS

Notations and Nomenclature

Figure 1B:
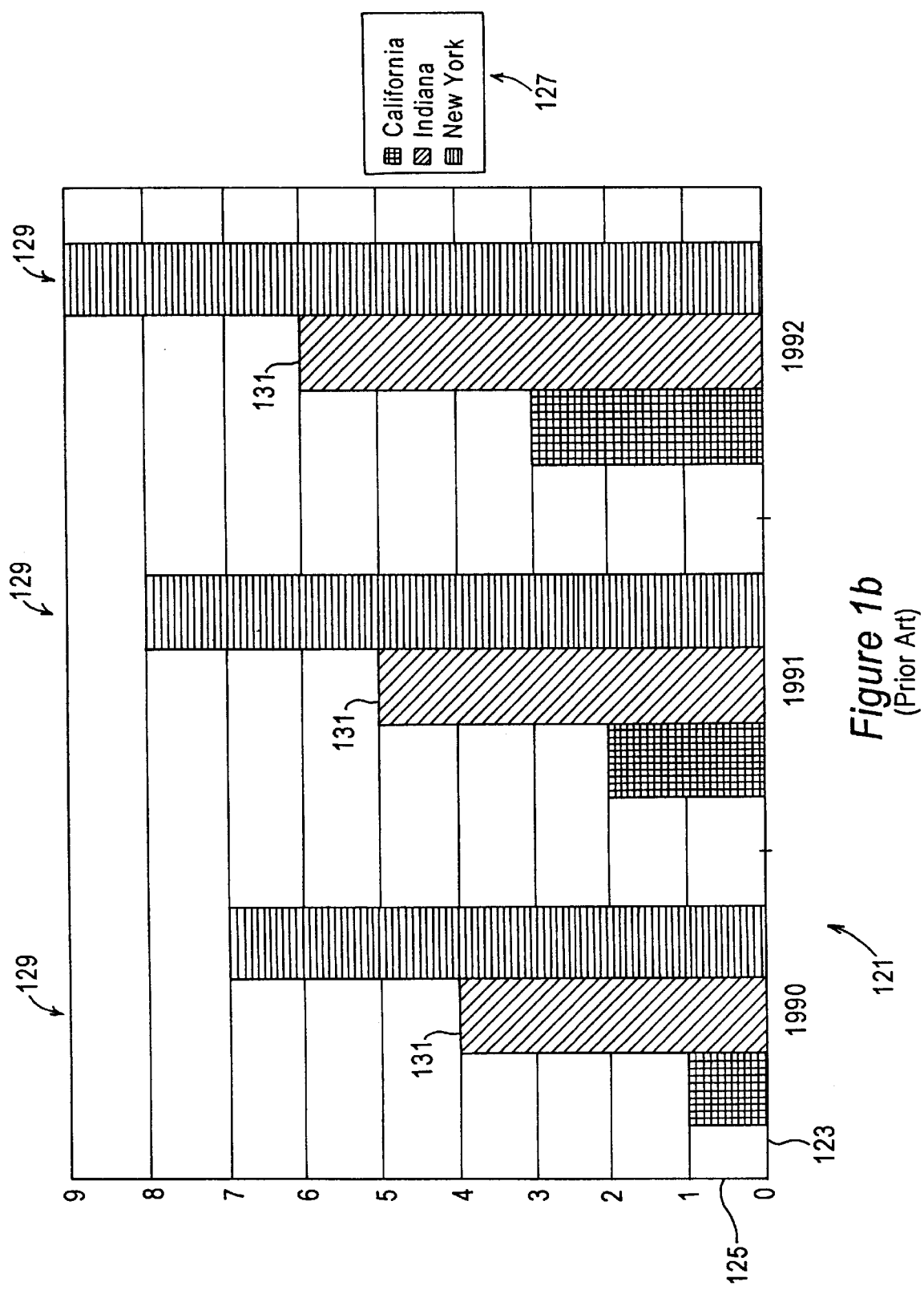
FIGS. 1*a*&*b* illustrate common characteristics of graphs and tables.

The following "notations and nomenclature" are provided to assist in the understanding of the present invention and the preferred embodiments thereof.

Drawing area—A region on a computer display where an application presents information. The drawing area may be a pane inside a window or the entire window dependent on the manner the drawing area is utilized. Often multiple drawing areas are present in a single window.

Graphical User Interface (GUI)—A user interface that allows a user to interact with a computer display by pointing at selectable control areas on the display and activating a command or computer operation associated with the selectable control area. GUIs are well known in the art.

Primary Information—Information in a table or graph that is the information of interest. In a table of data the primary data is the information within the body cells of the table. The primary information is often typed and classified by secondary information at the edges of the primary information. In a chart, the primary information is that representing data whether as bars, lines, points, areas or other representation. This primary information is explained and/or described by supplemental information.

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. Pointing devices are generally used with graphical user interfaces.

Render—The process of preparing a representation of information that will be displayed. Some devices display information at the time the information is rendered, other devices display the rendered information when the rendering process is complete.

Supplemental Information—Information in a table or graph that serves as classification data, naming data, explanatory data, legend data, organizational data, typing data, identification data or similar data used to clarify the primary information in the table or graph to a user.

Selectable control area—An area on a computer display that is sensitive to activation of a pointing device. On activation of the pointing device over the selectable control area, a command or computer operation associated with the selectable control area is invoked. Most computer systems that provide a Graphical User Interface (GUI) also provide other methods for invoking these commands or computer operations such as keyboard function keys or command lines.

Window—An area, usually rectangular, on a computer display screen controlled by an application.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the procedure.

Operating Environment

Figure 4:
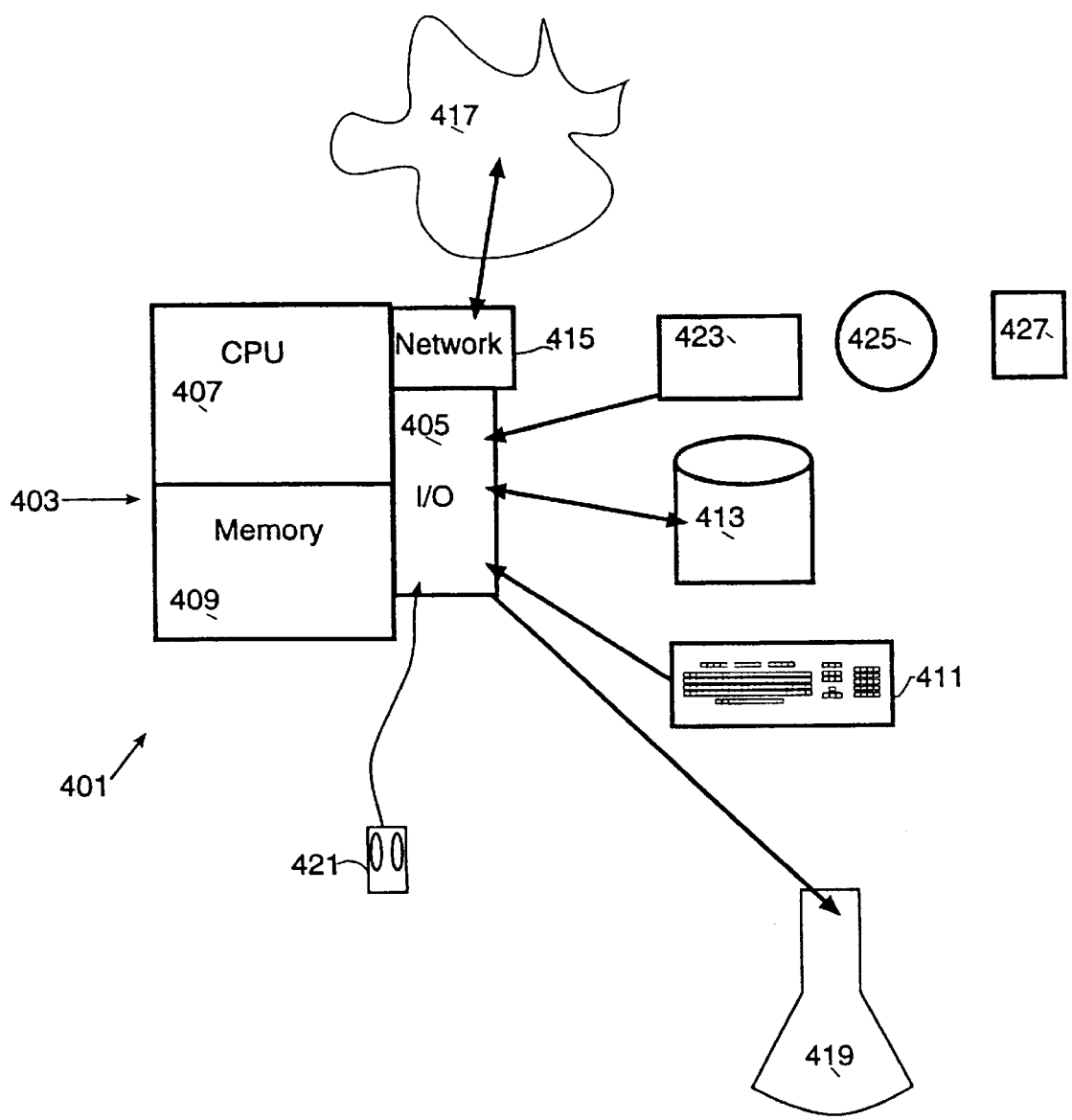
FIG. 4 illustrates a portion of a computer system, including a CPU a conventional memory, and a display device in which the present invention may be embodied.

Some of the elements of a computer system 401 configured to support the invention are shown in FIG. 4 wherein a processor 403 is shown, having an Input/Output ("I/O") section 405, a central processing unit ("CPU") 407 and a memory section 409. The I/O section 405 is connected to a keyboard 411, a disk storage unit 413, a network interface 415 to provide access to a network 417, a display unit 419, a pointing device 421 and a CD-ROM drive unit 423. The CD-ROM unit 423 can read a CD-ROM medium 425 that typically contains programs and data 427. The CD-ROM unit 423 (using the CD-ROM medium 425) and the disk storage unit 413 comprise a filestorage mechanism. Such a computer system is capable of executing information display applications that embody the invention.

Figure 3:
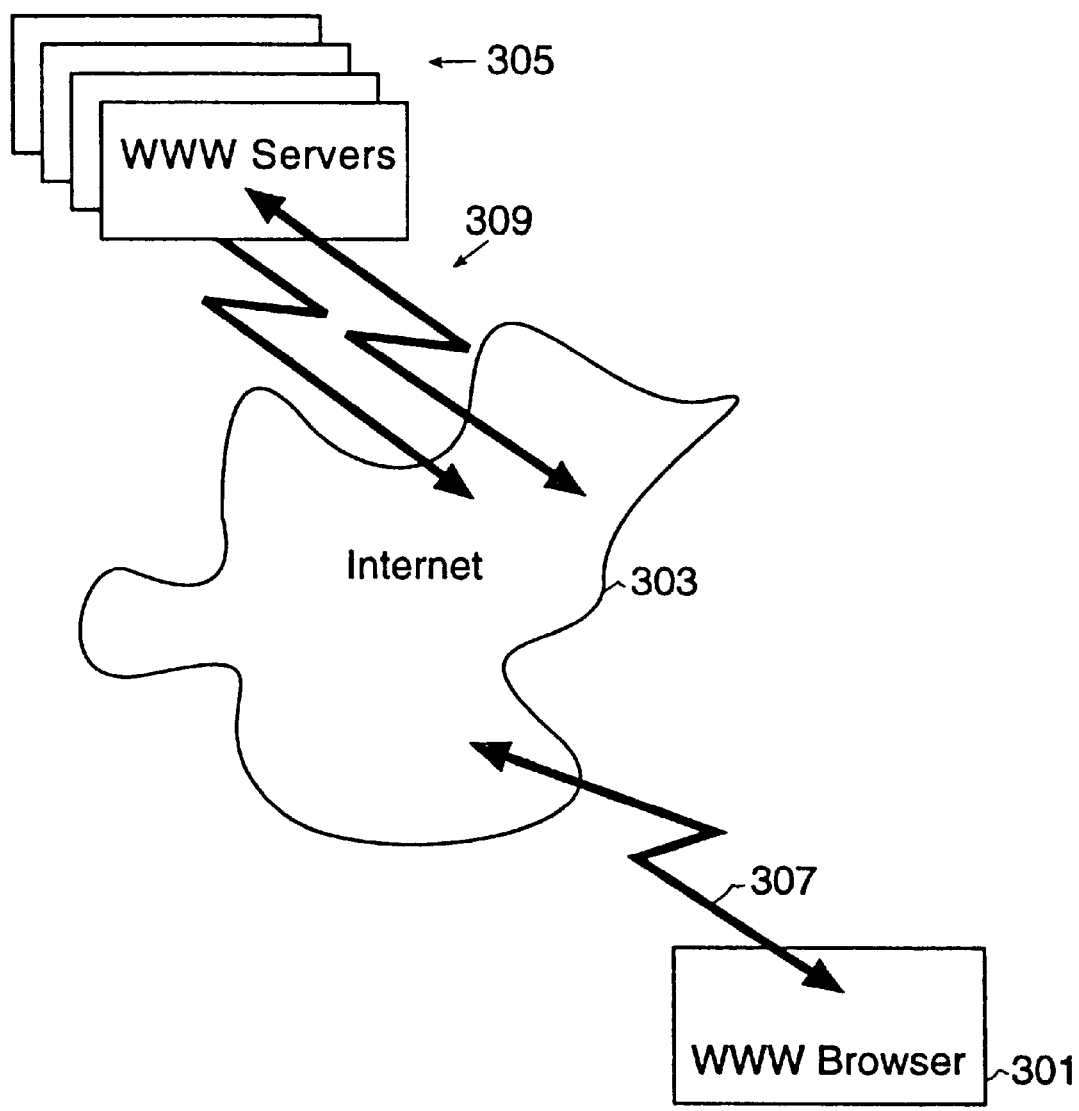
FIG. 3 illustrates a client-server information access system.

Those skilled in the art will understand that the invention does not require a client server architecture similar to the one illustrated in FIG. 3, nor does the invention require the network interface 415 or access to the network 417. Rather, the invention is directed toward presenting information to a user of a computer controlled display device independent of the source of the information. However, WWW browser applications are examples, without limitation, of applications that can use the invention.

Scroll Command Processing

Figure 5:
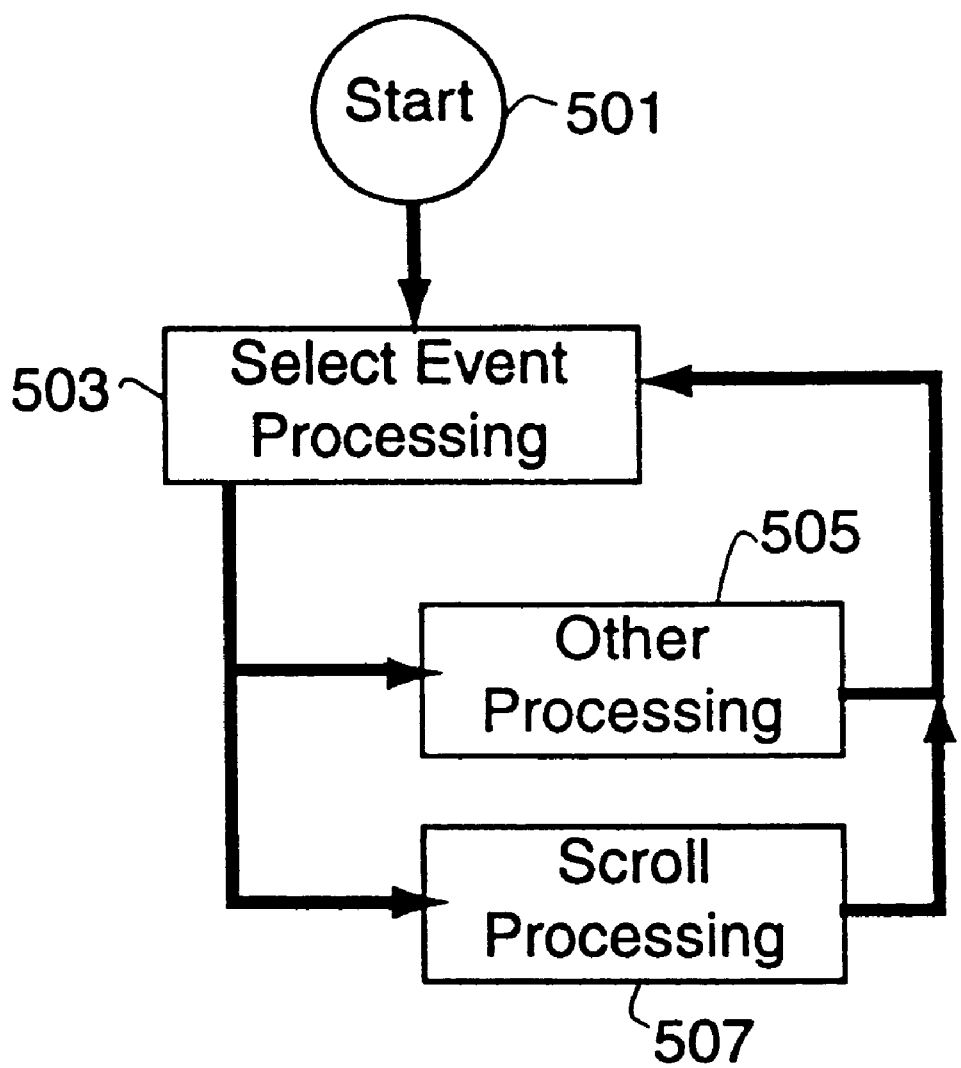
FIG. 5 illustrates a top level event processing loop used to invoke a scroll processing mechanism.

FIG. 5 illustrates the top level command processing for an event driven application. Those skilled in the art will understand that the invention can be implemented in application programs created using traditional procedural programming practices. After the application has completed its initialization the process starts at a terminal 501. A "Select Event Processing" procedure 503 receives events from the system. These events include user command events. These events are decoded and invoke appropriate procedures to process each event. Many of these events invoke a plurality of "Other Processing" procedures 505 that implement various operations. Additionally, scroll and page events invoke a "Scroll Processing" procedure 507. Those skilled in the art will understand that the invention works for both paging and scrolling events. The following describes the procedure used for scrolling in a preferred embodiment.

Figure 6:
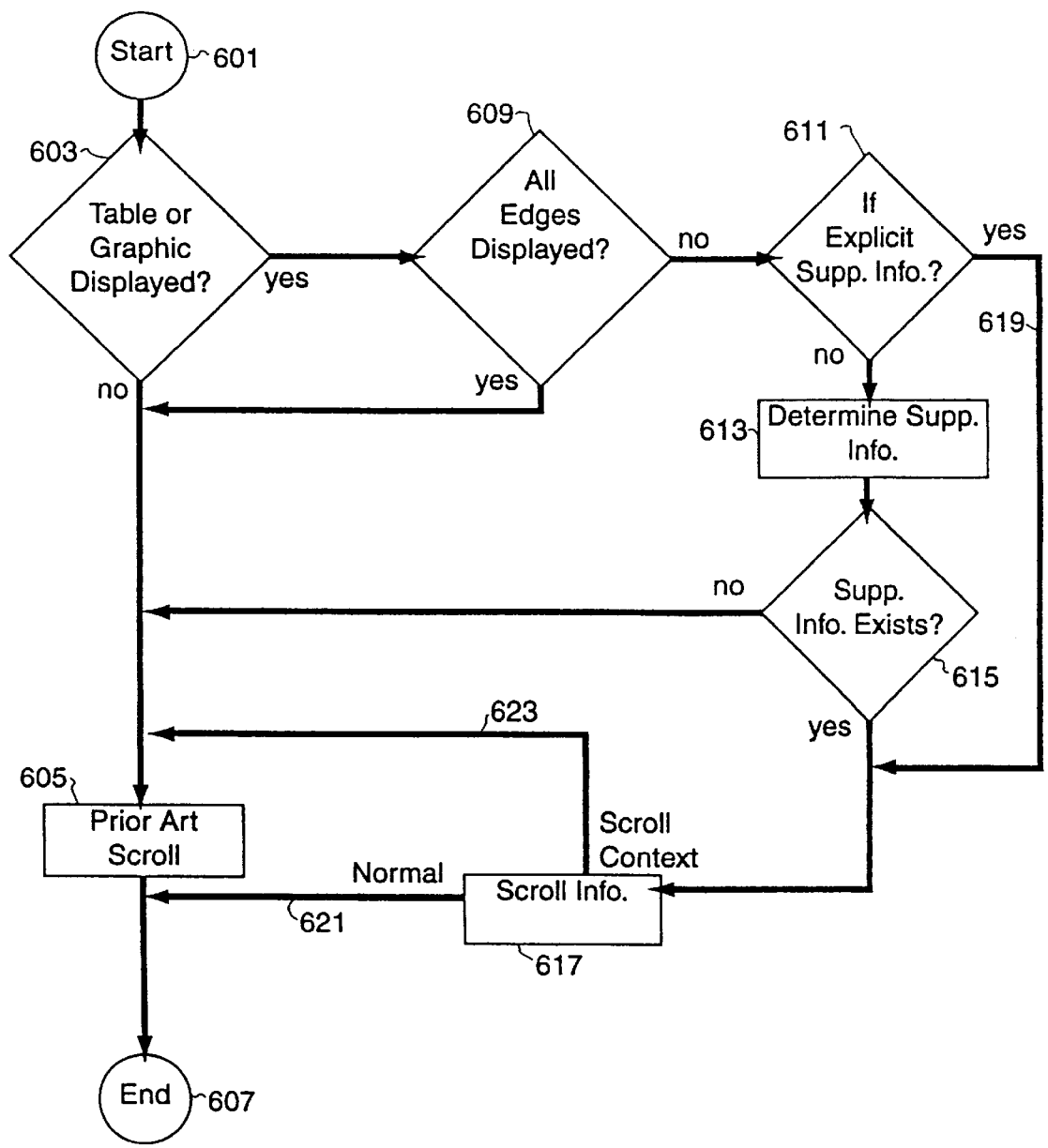
FIG. 6 illustrates an information scroll processing mechanism in accordance with a preferred embodiment.

FIG. 6 illustrates the process used to scroll tables and graphics in accordance with a preferred embodiment of the invention. The process starts at a terminal 601 invoked from the "Scroll Processing" procedure 507. At a decision procedure 603, the process determines whether a table or graphic is to be presented to a user. If at the decision procedure 603, neither a table or graphic is to be presented to the user, or if the table or graphic is conditioned to not invoke the facilities of the invention (such as by an attribute setting within an HTML tag) the process continues to a "Prior Art Scroll" procedure 605 that scrolls the information presented to the user on the display device in a manner well known in the art. Finally, the process completes through an "End" terminal 607.

However, if the decision procedure 603 determines that a table or graphic is to be displayed to the user, the process continues to an "All Edges Displayed" decision procedure 609. This decision procedure 609 determines whether all of the edges of the table or graphic will be displayed during the current display cycle. If this condition holds, the entire information will be presented on the display device in the drawing area (thus not requiring the invention), and the process continues to the "Prior Art Scroll" procedure 605 and completes through the "End" terminal 607.

However, if the decision procedure 609 determines that not all edges of the table or graphic will be presented on the display device, the process continues to an "Explicit Supplemental Information" decision procedure 611. This decision procedure 611 determines whether the data specifying the table or graphic includes explicit supplemental information designations. In the table case, this information would include an explicitly identified header, footer, leftside, or rightside information designation contained in the table specification (for example, in the HTML case, as an attribute to the <TABLE>tag or as a specific table tag such as <TH>). In the graphic case, this explicit supplemental information would include an explicitly designated legend, title or axis label; or area of an image containing these. If at the decision procedure 611, the process does not find explicit supplemental information designations within the data specifying the information to be presented, the process continues to a "Determine Supplemental Information" procedure 613 that heuristically determines whether the provided data includes supplemental information. Next, at a decision procedure 615, the process tests whether the "Determine Supplemental Information" procedure 613 successfully located supplemental information and if not the process continues to the "Prior Art Scroll" procedure 605 and completes through the "End" terminal 607. However if the decision procedure 615 determines that supplemental information exists, the process remembers the information relating to the supplemental information for later use and continues to a "Scroll Information" procedure 617.

Looking again at the "Explicit Supplemental Information" decision procedure 611, if explicit supplemental information is associated with the table or graph the process remembers the information relating to the supplemental information for later use and continues to the "Scroll Information" procedure 617 as indicated by an arrow 619.

At the "Scroll Information" procedure 617 the process has determined that the table or graphic will be partially presented, and that supplemental information exists for the table or graphic. The "Scroll Information" procedure 617 is described in detail below. This procedure 617 has two different exits. The "Normal" exit is indicated by an arrow 621. The "Scroll Context" exit is indicated by an arrow 623. The "Normal" exit 621 is taken when the table or graphic is scrolled without scrolling the surrounding displayed context. The "Scroll Context" exit 623 is used when the table or graphic information starts to scroll into or out of the drawing area such that the surrounding displayed context needs to be scrolled along with the information. Thus, if the "Scroll Information" procedure 617 scrolls the table or graph without requiring the surrounding context to be scrolled, the procedure 617 returns by the "Normal" exit 621 and the process completes through the "End" terminal 607. However, if the procedure 617 returns by the "Scroll Context" exit 623, the process performs the "Prior Art Scroll" 605 process and completes through the "End" terminal 607. When the "Scroll Context" exit 623 is taken, the table or graphic information has already been conditioned such that the context scroll will correctly position the displayed information at the completion of the prior art context scroll.

Figure 7:
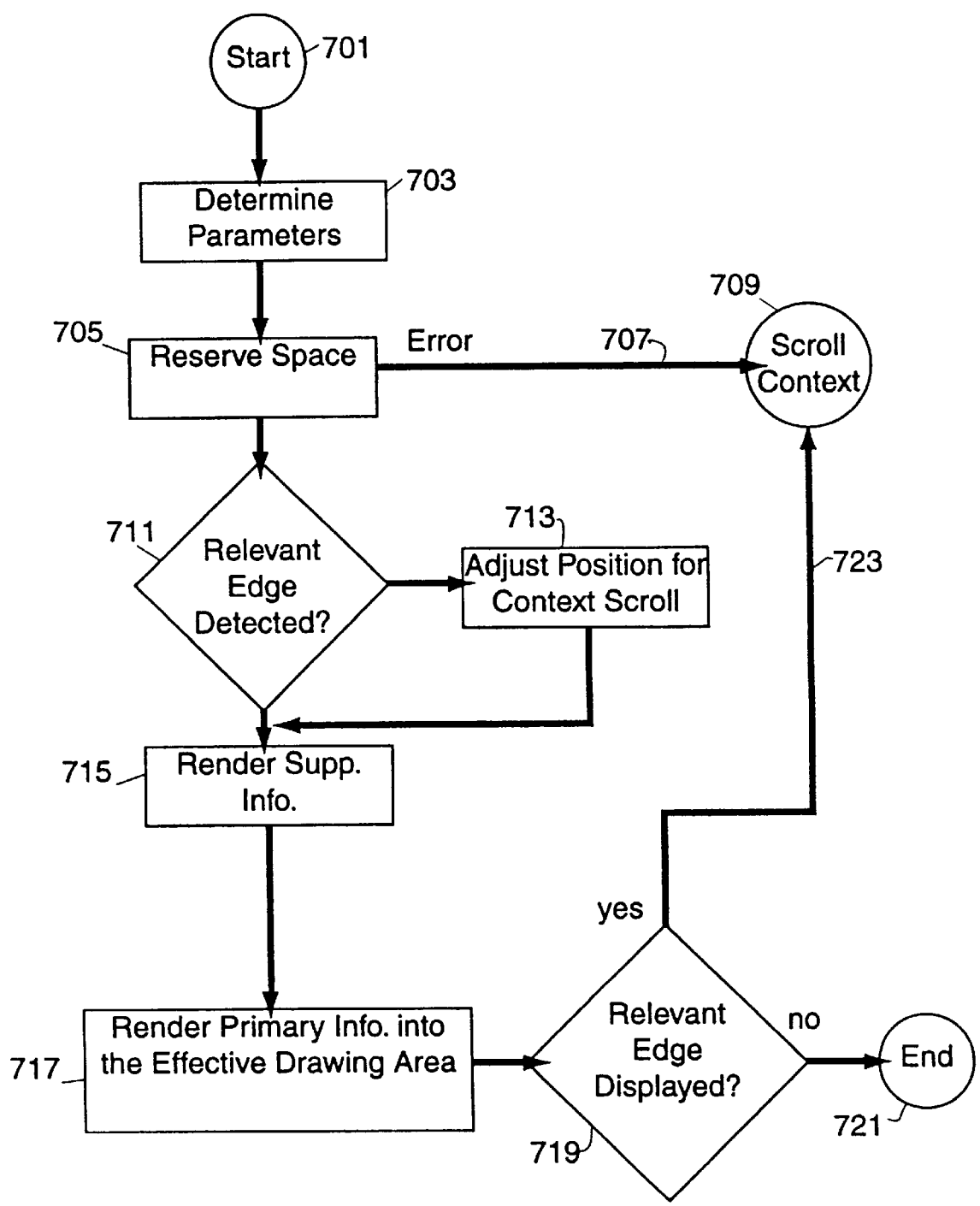
FIG. 7 illustrates a process used to scroll information having primary and secondary information in accordance with a preferred embodiment.

FIG. 7 illustrates the procedure used by the "Scroll Info" step 617 in accordance with a preferred embodiment. This procedure is used to scroll primary information without scrolling the context within which the primary information is displayed. The process begins at a "Start" terminal 701 and continues to a "Determine Parameters" procedure 703 that determines a number of parameters required by subsequent operations and described in more detail below. After the parameters have been determined 703, the process continues at a "Reserve Space" procedure 705. This procedure 705 determines whether sufficient drawing area exists to utilize the invention. That is, whether sufficient primary information can be displayed in the drawing area if supplemental information is also displayed. This procedure 705 is also further described below. The "Reserve Space" procedure 705 has an error return, as indicated by an arrow 707, that indicates that insufficient drawing area is available to display the minimal amount of primary information along with any of the supplemental information. The error return 707 causes the process to continue to a "Scroll Context" exit terminal 709 that causes the "Scroll Context" procedure 617 to take the "Scroll Context" path as indicated by the arrow 623.

However, if sufficient drawing area exists to display any supplemental information along with a selection of the primary information, the "Reserve Space" procedure 705 continues to a decision procedure 711 that detects which edges of the primary information are relevant edges. This procedure 711 also stores the result of this test for later use. A relevant edge is an edge of the primary information that indicates the end of the information in relation to the scroll operation. Thus, when scrolling vertically, the relevant edge is the top or bottom of the information. Thus, when a relevant edge is displayed, the context of the other displayed information (that information, such as text, graphics, or applets, external to the drawing area containing the primary or supplemental information of a table or graphic) scrolls along with the primary information. If the decision procedure 711 detects a relevant edge, processing then advances to an "Adjust Position for Context Scroll" procedure 713. This procedure 713 adjusts the space available for, and the position where the supplemental and selected primary information will be displayed in the drawing area such that the prior art scroll (that will be later invoked) will properly position the supplemental and selected primary information. After the adjustment performed by the procedure 713, the process continues to a "Render Supplemental Information" procedure 715.

The "Render Supplemental Information" procedure 715 renders the supplemental information to be presented to the user on the display. This procedure 715 is further described below. After rendering the supplemental information, the process continues to a "Render Primary Information into the Effective Drawing Area" procedure 717. This procedure 717 renders the scrolled selected primary information into the effective drawing area using prior art methods.

The process continues to a decision procedure 719 that accesses the information stored at the decision procedure 711 indicating whether a relevant edge is displayed. If the decision procedure 719 detects that the decision procedure 711 determined that a relevant edge is not displayed, the process completes through an "End" terminal 721. Otherwise, the process continues as indicated by an arrow 723 to exit through the "Scroll Context" 709 exit terminal. As mentioned above, the "Scroll Context" 709 exit terminal causes the prior art to scroll the context as a whole including the rendered table or graph.

Determine Parameters Procedure

Figure 8:
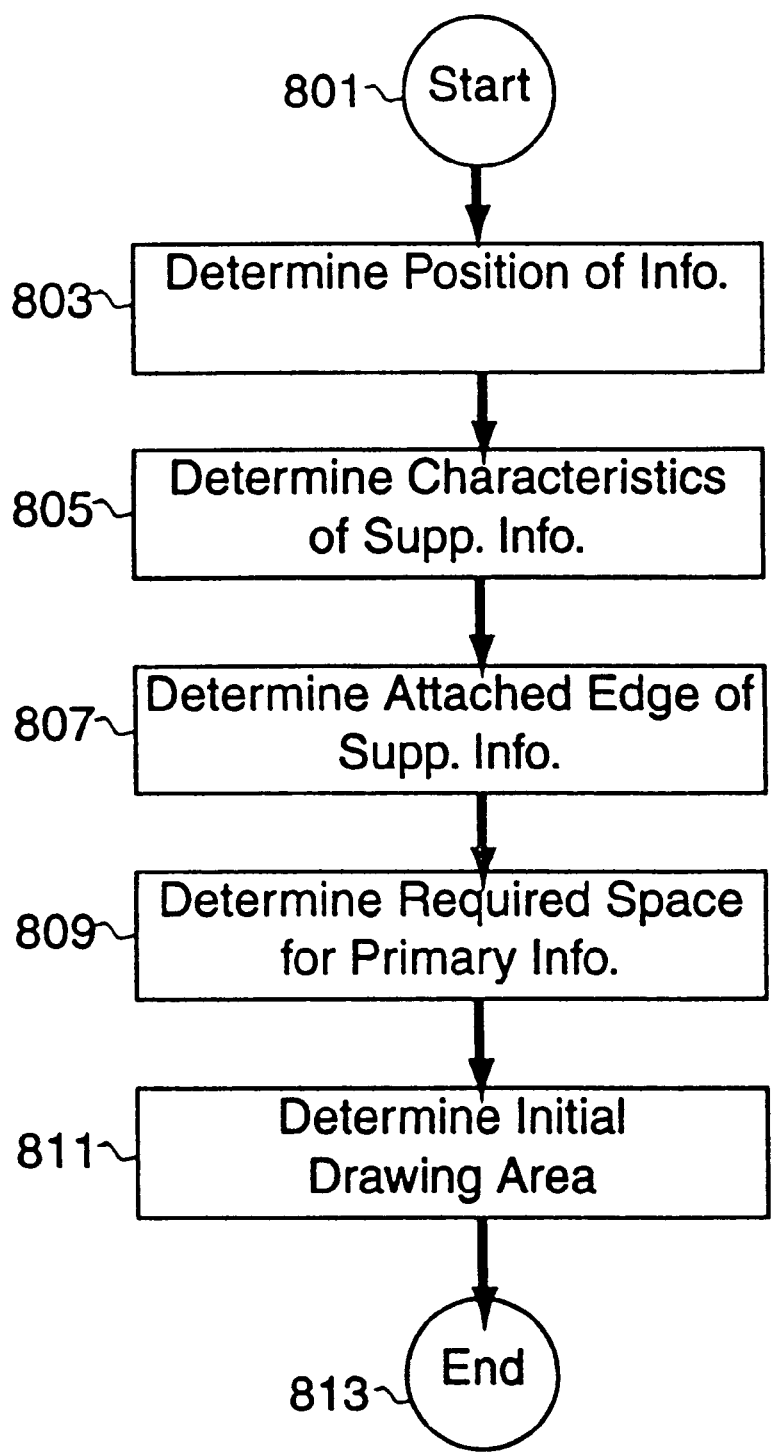
FIG. 8 illustrates a process used to determine parameters related to the display of information in accordance with a preferred embodiment.

FIG. 8 illustrates the operation of the process used to determine the parameters related to the display of the information. This process is invoked at the "Determine Parameters" procedure 703 of FIG. 7. The process begins at a "Start" terminal 801 and continues to a procedure 803 used to determine which portion of the information will be displayed in the drawing area. Where the portion of the information to be displayed is part of a table, the procedure 803 determines which columns and rows are to be displayed—the selected primary information. The procedure 803 also determines the scroll amount for positioning the displayed columns and rows. Where the information portion is part of a graph, the corresponding operation is performed using an area of the graph as the selected primary information.

Next, the process continues to a "Determine characteristics of Supplemental Information" procedure 805. This procedure 805 examines the information stored by the procedure steps 611 and 613 about the supplemental information to determine just what supplemental information is to be presented and the area required to display the supplemental information.

Next at a procedure step 807, the process determines which edge of the primary information is attached to each supplemental information. For a table, attached edges are the rows and columns that surround the body cells. The attached edge is related to a supplemental information in that the attached edge indicates where the supplemental information is to be displayed with respect to the position of the primary information. Thus, the top edge of the table is the attached edge for a header, the bottom edge for a footer, the leftside and rightside for row labels. For a graphic, the bottom horizontal axis is generally the bottom edge, and the left vertical axis is generally the left edge. The attached edge is used to determine the position and orientation of the displayed supplemental information. This determination is based on either the explicit supplemental information specification in the table or graph information; or within the procedure labeled as 613 within FIG. 6.

The process continues to a procedure 809 that determines the minimum size of the drawing area required to display a unit of primary information. In the case of a table, the process determines the maximum height and width of the body cells adjacent to the supplemental information such that at least one complete body cell is displayed. In the case of an image, the process requires that the primary information displays a sufficient area of the graphic to be useful to a user. One skilled in the art will understand that this sufficient area may be a user preference, some fraction of the size of the graph or some other measure appropriate to provide a user with sufficient detail to understand the portion of the graphic displayed.

At a "Determine Initial Drawing Area" procedure 811, the process determines and saves the size of the initial drawing area available for presenting the supplemental and body information. Finally the process completes through an "End" terminal 813.

Reserving Space

Figure 9:
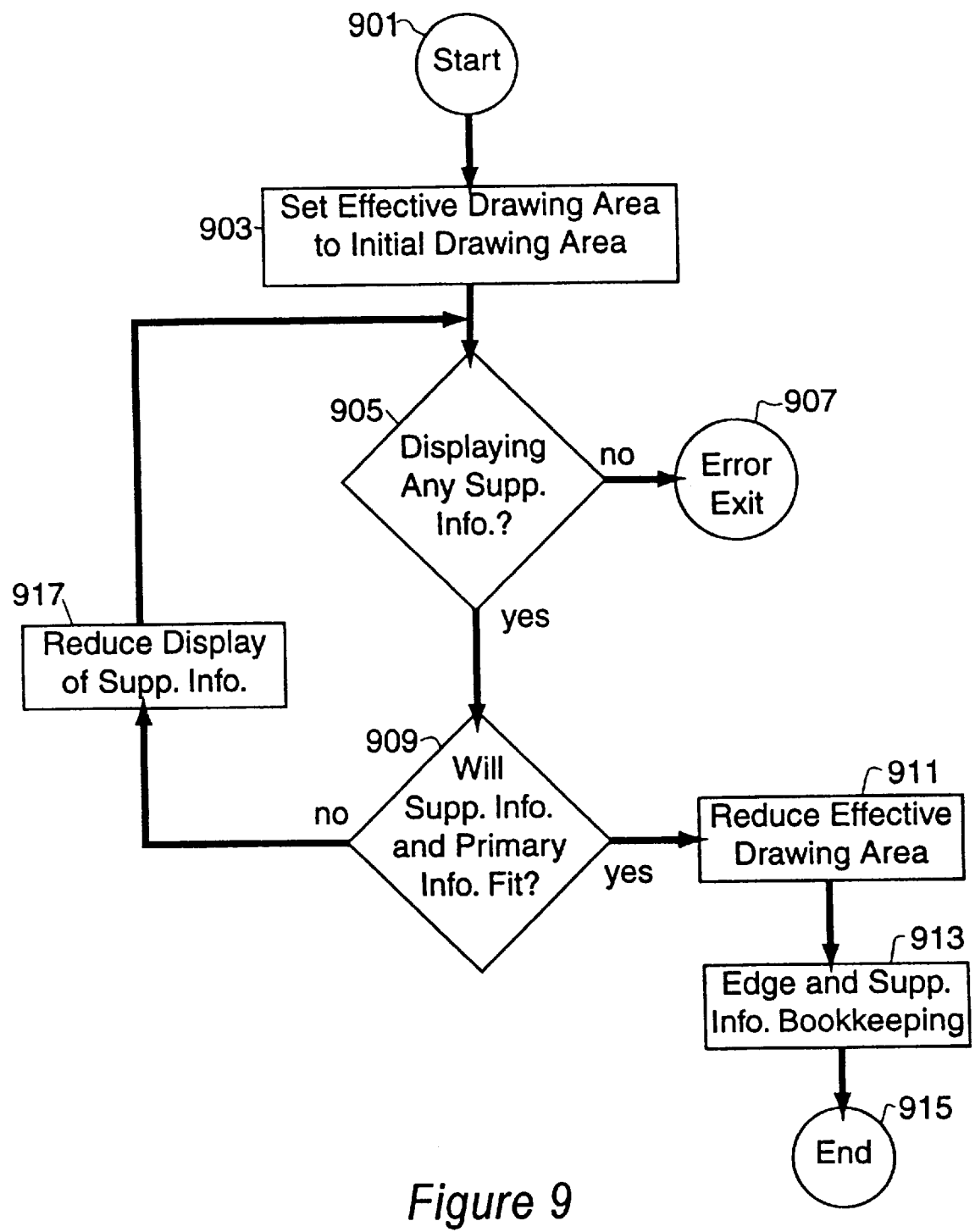
FIG. 9 illustrates a process used to reserve space for the display of supplemental information in accordance with a preferred embodiment.

FIG. 9 illustrates the process used to effectuate the "Reserve Space" procedure 705. The process starts at a "Start" terminal 901 and continues to an initialization procedure 903. This initialization procedure 903 sets an "effective drawing area" variable to that of the saved initial drawing area values determined by the procedure 811. This "effective drawing area" variable eventually may be reduced by the drawing area used to display the supplemental information. Then at a "Displaying Any Supplemental Information" decision procedure 905, the process checks to determine whether any supplemental information will be displayed. If the decision procedure 905 determines that no supplemental information is to be displayed, the process exits through an "Error Exit" 907 terminal. When the process exits through this terminal 907, the process flow indicated by the arrow 707 is invoked to exit the "Scroll Information Processing" process of FIG. 7 though the "Scroll Context" terminal 709. If supplemental information is to be displayed the process continues to a decision procedure 909 that determines whether the drawing area required to display the supplemental information and the area required to display the minimal primary information can be contained within the effective drawing area. If the decision procedure 909 determines that the supplemental and minimal primary information fits within the effective drawing area, the process continues to a "Reduce Effective Drawing Area" procedure 911, that reserves drawing area for the supplemental information by reducing the size of the effective drawing area available to display of the primary information. Next, the bookkeeping procedure 913 stores placement and size data about each supplemental information for later use. Finally, the process completes through an "End" terminal 915.

However, if at decision procedure 909 the supplemental information and the minimal primary information will not fit within the effective drawing area, the process advances to a "Reduce Display of Supplemental Information" procedure 917 that removes one of the supplemental information from the possibility of display. Thus, the drawing area consumed for display of supplemental information is reduced. These procedure steps 905, 909, and 917 may repeat leaving only primary information to be displayed thus causing the process to exit through the "Error Exit" terminal 907.

Render Supplemental Information

Figure 10:
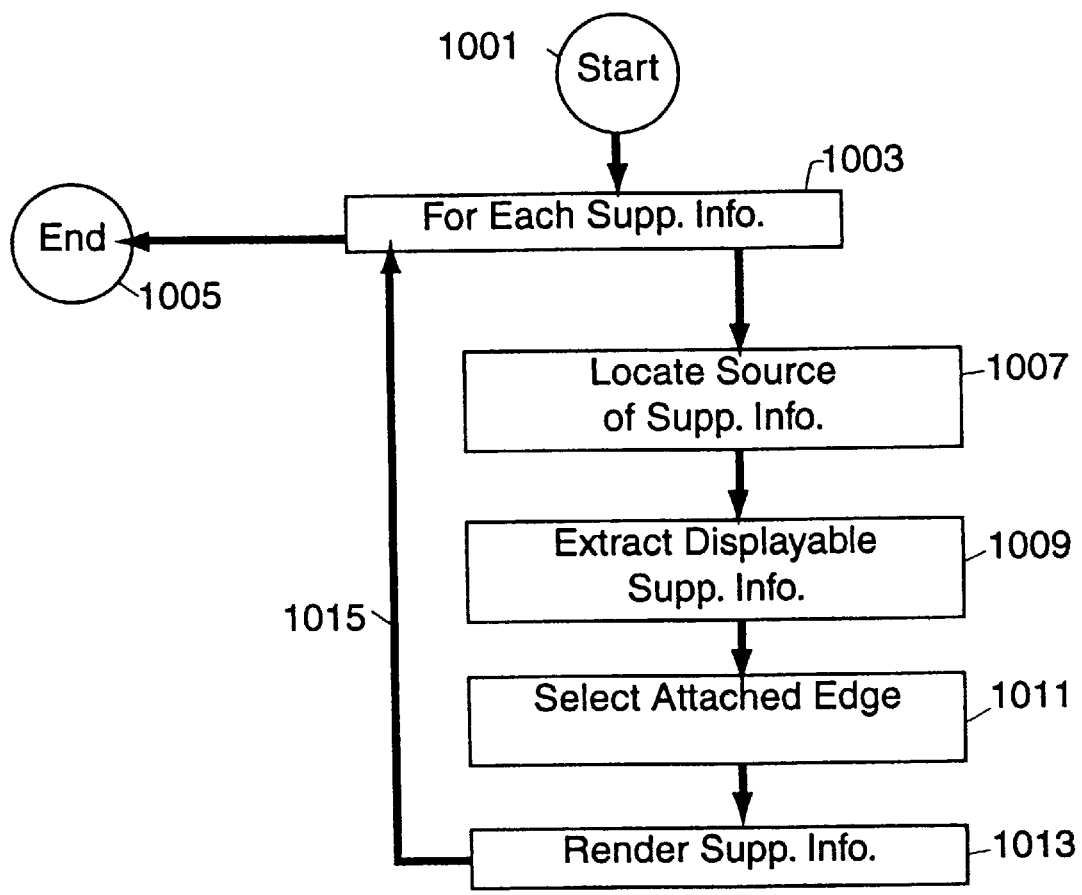
FIG. 10 illustrates a process used to display supplemental information in accordance with a preferred embodiment.

FIG. 10 illustrates the process used to display the supplemental information in the drawing area. Recall that the supplemental information is displayed in a reserved drawing area apart from the specified effective drawing area. The reserved drawing area was allocated by the "Reduce Effective Drawing Area" procedure 911. The process illustrated by FIG. 10 is invoked by the "Render Supplemental Information" procedure 715. The process begins at a "Start" terminal 1001 and continues to an iterative procedure 1003 to control the display of each supplemental information. After all supplemental information has been rendered, the process completes through an "End" terminal 1005.

For each supplemental information, a "Locate Source of Supplemental Information" procedure 1007 first locates the data that represents a particular supplemental information. Then at an "Extract Displayable Supplemental Information" procedure 1009 the process determines what portion of the supplemental information is to be displayed. For example, if performing a horizontal scroll of a table that is wider than the drawing area, the supplemental information that represents the header of the table needs to be positioned so that the header information aligns with the displayed body columns. The same approach is taken when performing vertical scrolling with the row labels. Next, at a "Select Attached Edge" procedure 1011 the process selects which edge of the drawing area will be used to display the supplemental data (from the placement and size data saved above in the bookkeeping procedure 913). Finally, at a "Render Supplemental Information" procedure 1013, the supplemental information is rendered in the drawing area reserved for the supplemental information and the process iterates to the next supplemental information as indicated by an arrow 1015 until all supplemental information is rendered.

Determine Supplemental Information for Tables

Figure 11:
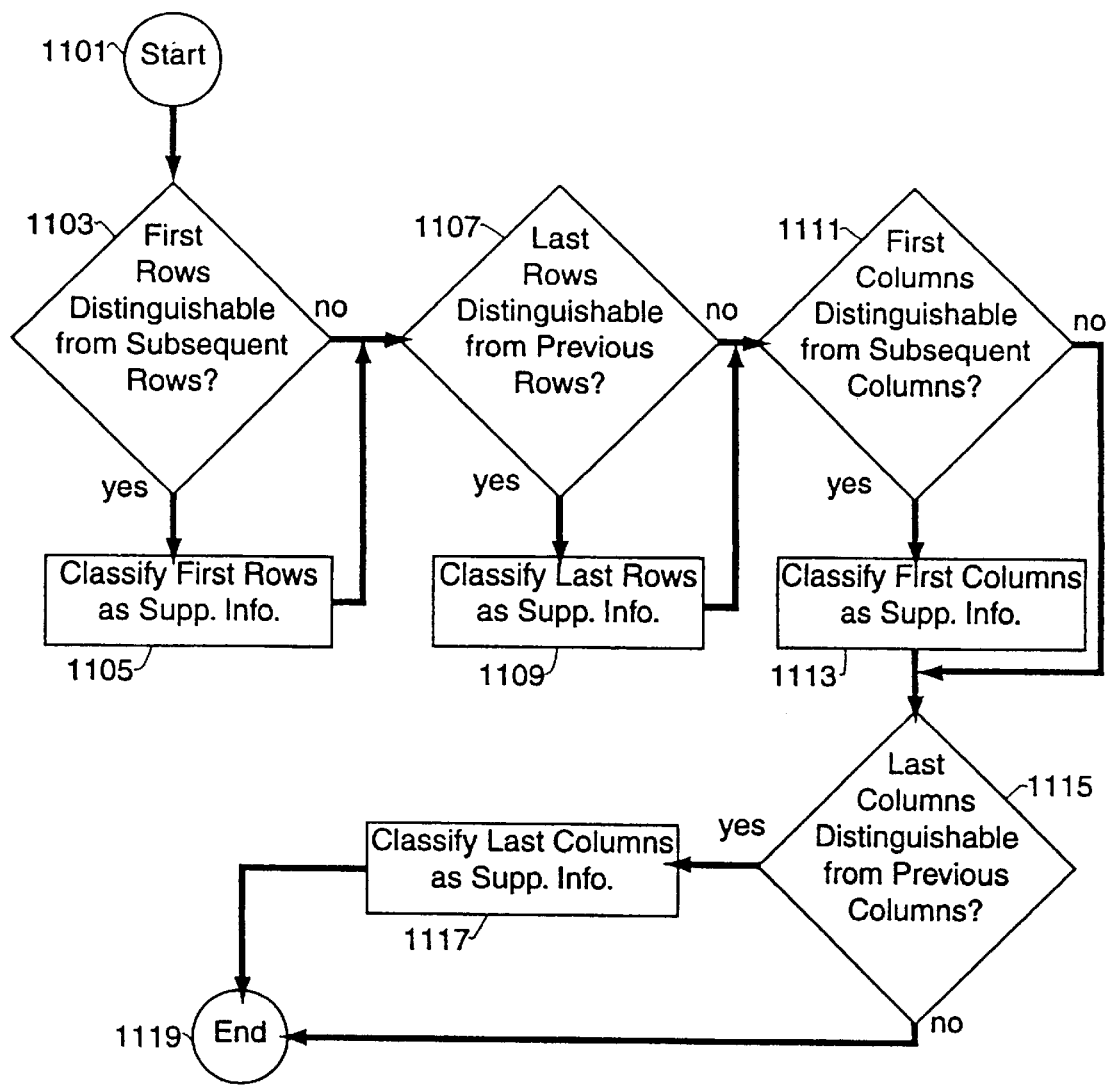
FIG. 11 illustrates a process used to determine supplemental information for a table that does not have explicit supplemental information within the table specification in accordance with a preferred embodiment.

FIG. 11 illustrates the process used to determine supplemental information for a table that does not have explicit supplemental information within the table specification. Thus, this process is used by the "Determine Supplemental Information" procedure 613 described above. This process begins at a "Start" terminal 1101 and continues to a first decision procedure 1103 that determines whether the first rows of the table are distinguishable from subsequent rows (the body rows) of the table. The first rows are distinguishable if the contents of the first rows are sufficiently different from subsequent rows. Examples of such differences, without limitation, are if the first rows contain text and subsequent rows contain numbers or such as the first rows containing text that is centered, bold, or having other formatting characteristics different from the formatting of text in subsequent rows. If the first decision procedure 1103, determines that the first rows are distinguishable from subsequent rows the process then classifies the first rows as supplemental information at a procedure 1105. This procedure 1105 also indicates that this supplemental information is attached to the top of the table.

Regardless of the determination of the first decision procedure 1103, the process continues to a second decision procedure 1107 that determines whether the last rows are distinguishable from the previous rows (excluding any rows making up supplemental information determined from the procedure 1105—that is, the body rows). If the last rows are distinguishable, the process continues to a procedure 1109 that classifies the last rows as supplemental information and indicates that the supplemental information is attached to the bottom of the table.

Regardless of the determination of the second decision procedure 1107, the process continues to a third decision procedure 1111 that determines whether the first columns are distinguishable from subsequent columns (the body columns) using the same concepts as described above for the first decision procedure 1103. If so, a procedure 1113 classifies the first columns as supplemental information and indicates that the supplemental information is attached to the leftside of the table.

A final decision procedure 1115 determines whether the last columns are distinguishable from previous columns (the body columns). If so, a procedure 1117 classifies the last columns as supplemental information and indicates that the supplemental information is attached to the rightside of the table. Finally, the process completes through an "End" terminal 1119.

Determine Supplemental Information for Graphs

Figure 12:
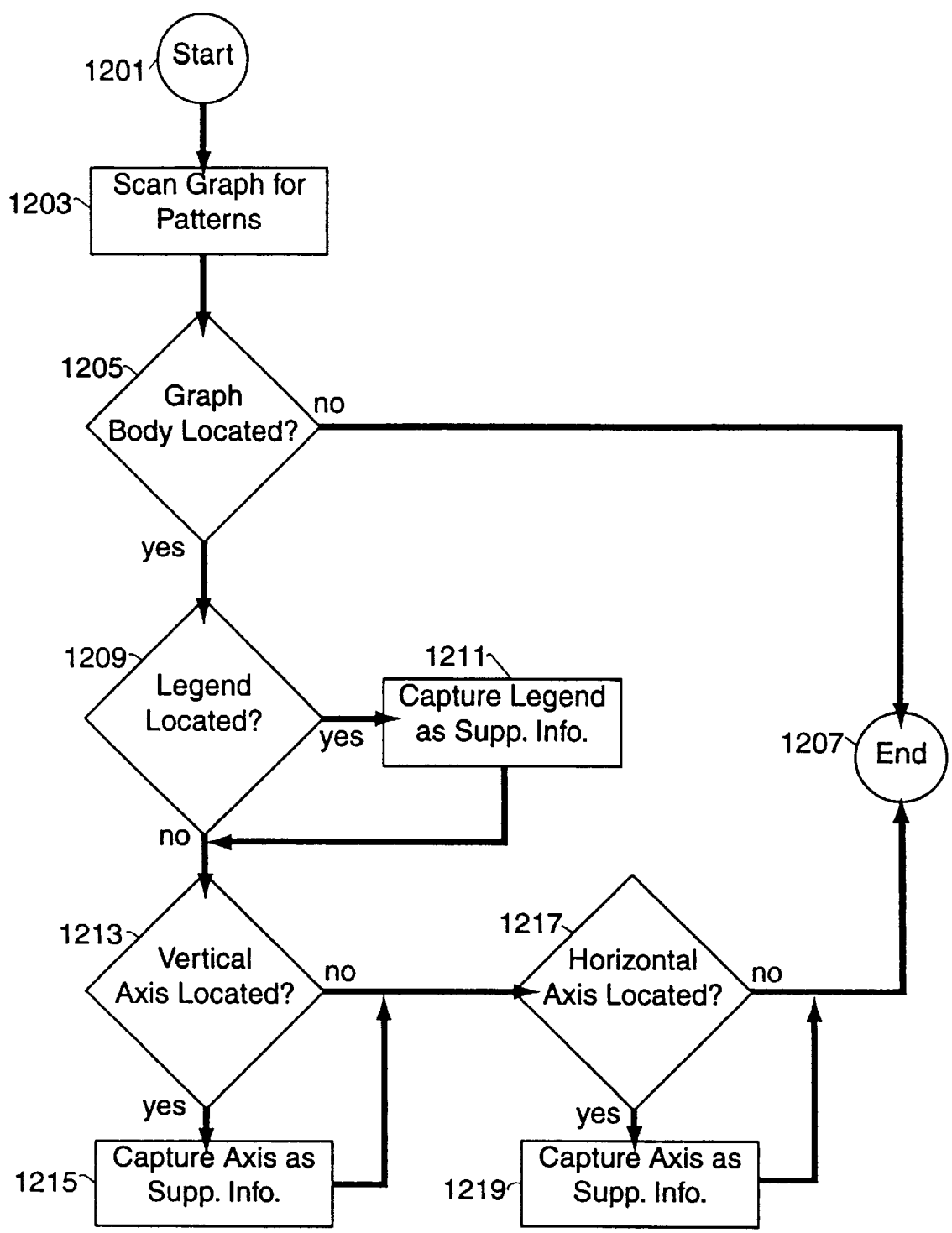
FIG. 12 illustrates a process used to determine supplemental information for a graph that does not have explicit supplemental information within the graph specification in accordance with a preferred embodiment.

FIG. 12 illustrates the process used to determine supplemental information for a graph that does not have explicit supplemental information within the graph specification. Thus, this process is used by the "Determine Supplemental Information" procedure step 613 mentioned above. This process begins at a "Start" terminal 1201 and continues to a first procedure 1203 that scans the data comprising the graph for patterns indicative of various parts of a chart. These parts include a graph body that contains similar graphics such as bars, lines, or other data value indicators; a legend that contains text associated with the data value indicators; a vertical axis that extends beyond (above or below) the data value indicators and may have tics and text associated with the axis; and a horizontal axis that extends beyond (to either side) the data value indicators and may have tics and text associated with the axis. A first decision procedure 1205 detects whether the first procedure step 1203 detected a graph body. If the first decision procedure 1205 did not detect a graph body, the process completes through an "End" terminal 1207.

If the process is able to locate the graph body at the first decision procedure 1205, the process then continues to a second decision procedure 1209 that determines whether a legend was located by the first procedure step 1203. If a legend was detected, the process captures the legend as supplemental information at a program step 1211. Regardless of the result of the second decision procedure 1209, the process continues to a third decision procedure 1213 that determines whether a vertical axis was detected at the first procedure step 1203. If a vertical axis was detected, the process then captures vertical axis related information such as the vertical axis itself, associated tick marks and axis annotation text at a procedure 1215. Regardless of the result of the third decision procedure 1213, the process continues to a fourth decision procedure 1217 that determines whether a horizontal axis was detected at the first procedure step 1203. If a horizontal axis was detected, the process then captures horizontal axis related information such as the horizontal axis itself, associated tick marks and axis annotation text at a procedure 1219. Regardless of the result of the fourth decision procedure 1217 the process completes through the "End" terminal 1207.

Application of the invention

FIG. 13a illustrates the operation of the invention when displaying the same document as was displayed in FIG. 2a. Each of a plurality of screen images 1301, 1303, and 1305 now display a portion of a table 1307. Each portion of the table 1307 has a display of supplemental information 1309 so that regardless of how the information is paged or scrolled, supplemental information is available to the user. Here, a relevant edge of the table in the screen image 1301 is located at a top edge of the table 1311 whereas, the relevant edge of the table for the screen image 1305 is located at a bottom edge 1313. There is no relevant vertical edge for the table in the screen image 1303.

FIGS. 13b–e illustrate the results of scrolling a table, included within a context, using the invention. A similar example could be constructed with horizontal scrolling or paging; or with a graphic instead of a table. A screen image 1321 contains a first drawing area 1323, a second drawing area 1325 and a table drawing area 1327 that contains a table 1329. The table 1329 again contains the characters "A" through "Z". The supplemental information is located at the top of the table 1329 in an area labeled as 1331 that is part of the table drawing area 1327. Because a relevant edge 1333 of the table 1329 is displayed, the context containing the first and second drawing areas 1323, 1325 scroll with the table drawing area. The screen image 1321 again includes a selectable control area 1335 having a thumb 1337. The logic used to position the thumb 1337 on the selectable control area 1335 can be dependent either solely on the position of the context, or dependent on the position of the context along with the position on the primary information displayed in the table drawing area 1327.

Figure 13B:
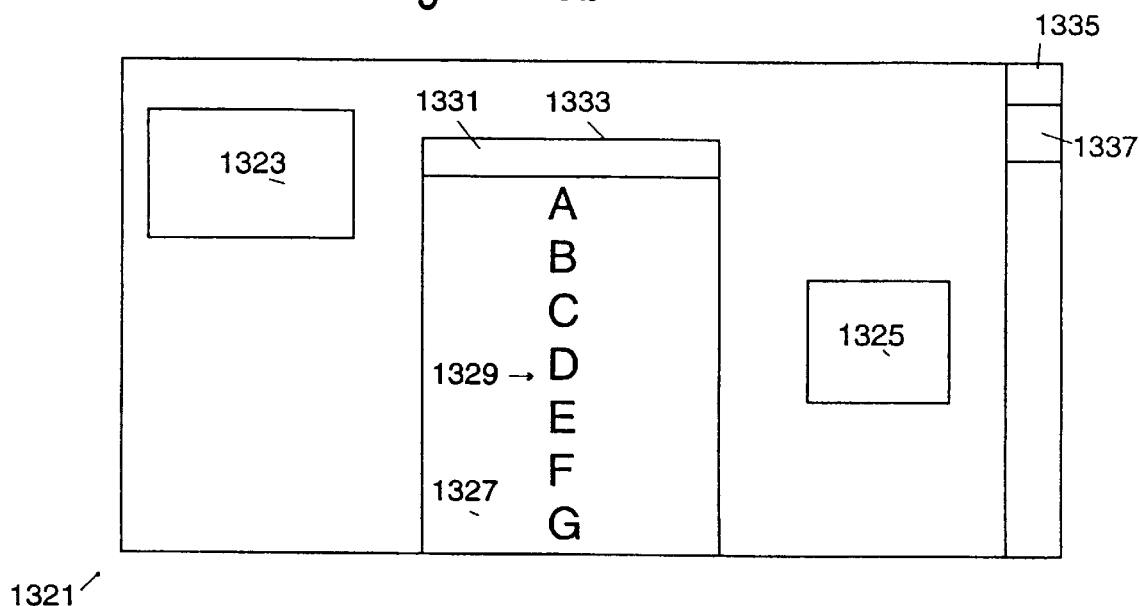
Figure 13C:
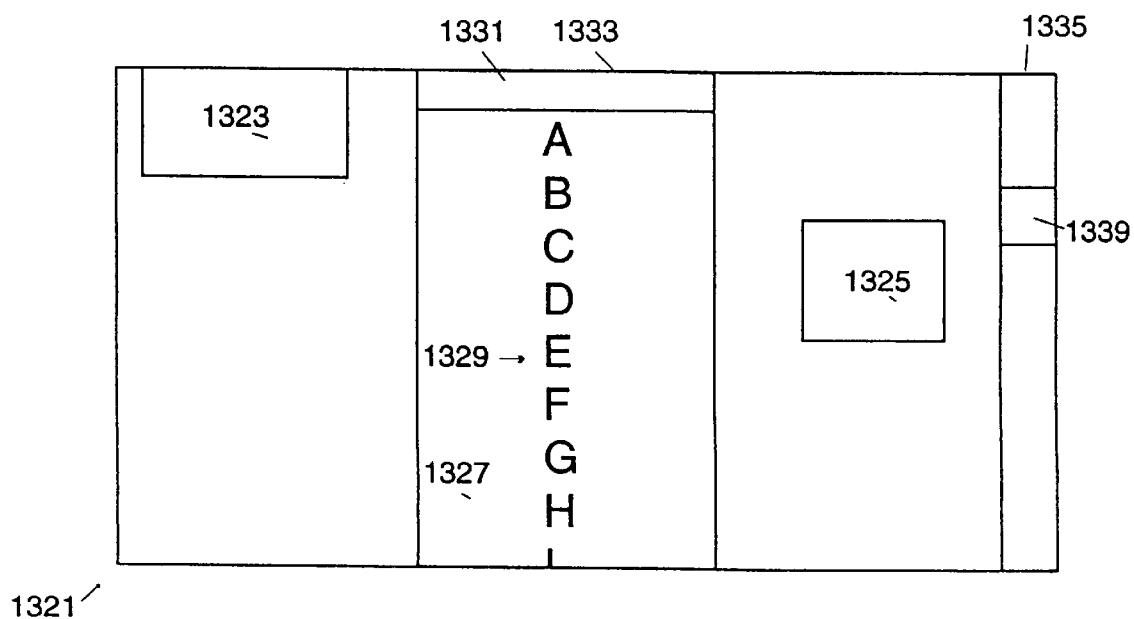
Figure 13D:
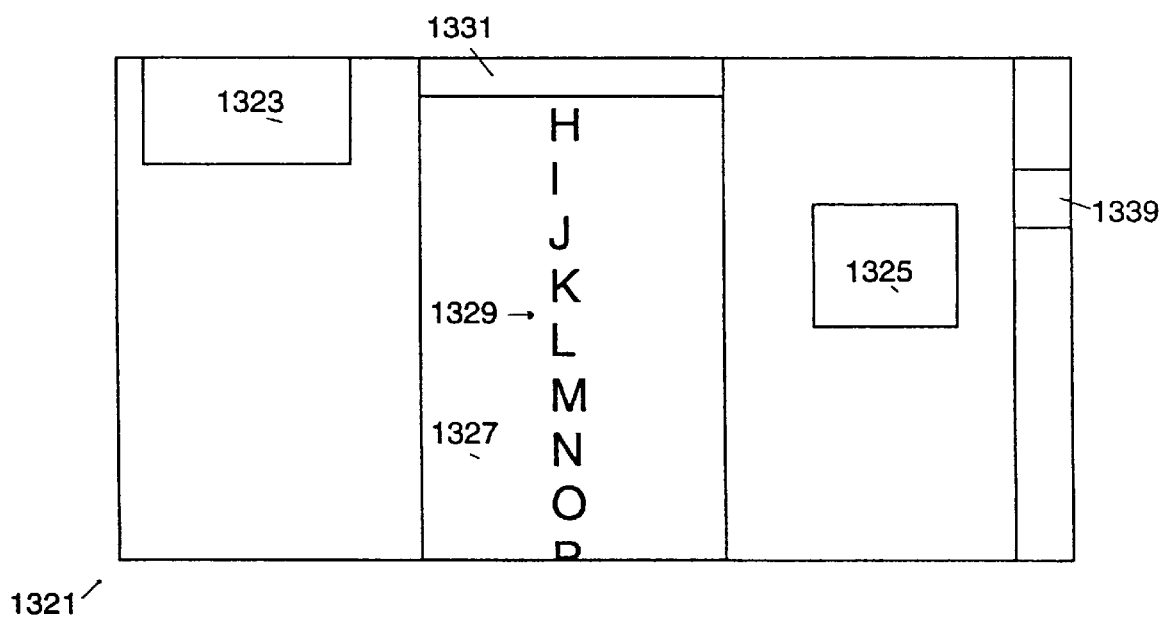

FIGS. 13c and 13d illustrate the same screen image 1321 described in FIG. 13b after being scrolled or otherwise repositioned. FIG. 13c has scrolled the context so that the relevant edge 1333 of the table drawing area 1327 is at the top of the display. The context has also scrolled upwards as can be seen by the position of the first drawing area 1323 (which has been partially scrolled off the display), the position of the second drawing area 1325, and a new position of a thumb 1339 on the selectable control area 1335. Along with the supplemental information (being at the top of the table 1329) the table display area 1327 now shows characters "A" through "H" and part of the character "I".

FIG. 13d is the screen 1321 after yet another scroll operation. Notice that the context, as indicated by the first and second drawing areas 1323 and 1325, is in the same position as in FIG. 13c. Further, that the supplemental information (in the area labeled as 1331) continues to be displayed at the top of the table drawing area 1327. However, the table 1329 has scrolled so that characters "H" through "O" and part of "P" are displayed. Thus the table 1329 has scrolled independent of the context of the rest of the display. The thumb 1339 stays at the same position in this preferred embodiment.

Figure 13E:
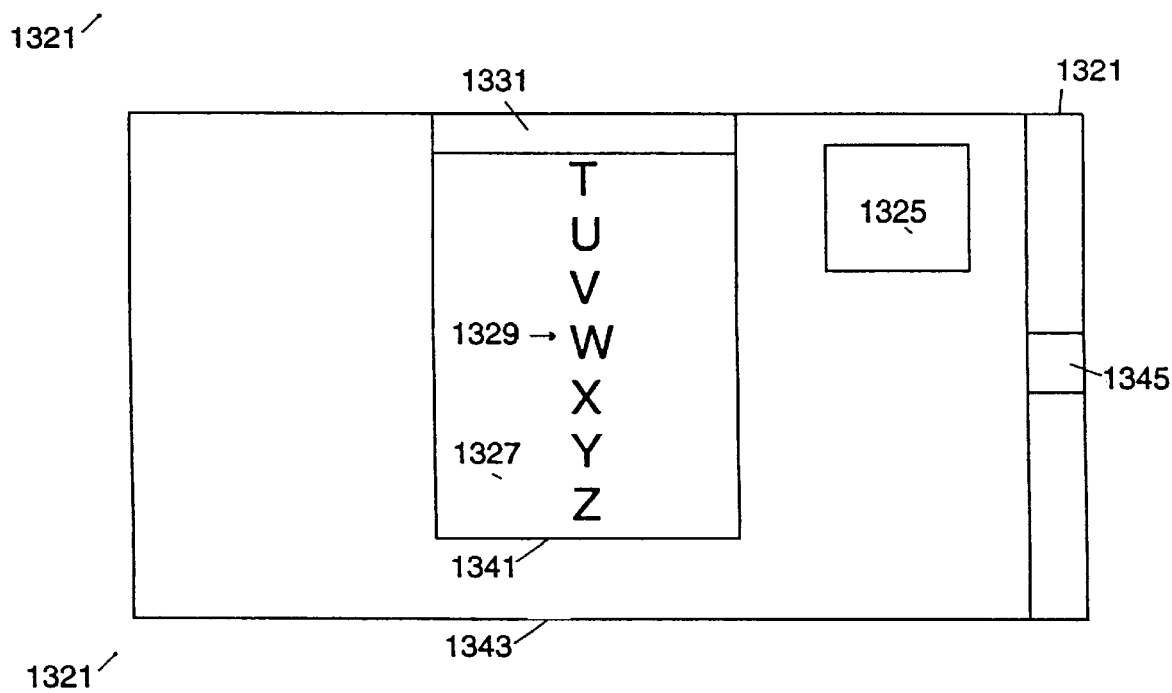

Finally, FIG. 13e illustrates the screen 1321 after scrolling to the end of the table 1329. A bottom relevant edge 1341 of the table drawing area 1327 has appeared thus allowing the context to scroll. Because the context was allowed to scroll, the first drawing area 1323 has been scrolled completely off the display and the second drawing area 1325 has been scrolled up by the same distance as the distance between the bottom relevant edge 1341 and the bottom of the display shown by a label 1343. In this preferred embodiment, a new position of a thumb 1345 indicates the new position in the context of the document containing the table.

One skilled in the art will understand that the invention as described above teaches a new process, apparatus, system, and computer program product configured to display tabular, graphical, and similar information on a display device.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for automatically displaying structured information on a computer controlled display device to a user; said structured information including a plurality of primary information and a supplemental information; said method comprising the steps of:

(a) determining that one or more but not all of said plurality of primary information is to be presented on said display device to said user; said plurality of primary information having an attached edge relating to said supplemental information;

(b) locating said supplemental information within said structured information; and (c) displaying a selection of primary information and said supplemental information within a drawing area on said display device; said supplemental information positioned within said drawing area dependent on said attached edge; said supplemental information corresponding to said selection of primary information; and said selection of primary information comprising one or more of said plurality of primary information.

2. The computer controlled method of claim 1 wherein step (c) comprises the step of detecting a supplemental information designation explicitly identifying said supplemental information within said structured information.

3. The computer controlled method of claim 2 wherein said supplemental information designation is specified according to a document markup language.

4. The computer controlled method of claim 1 wherein step (c) comprises the step of heuristically locating said supplemental information within said structured information.

5. The computer controlled method of claim 4 wherein step (c) further comprises the steps of:

(c1) distinguishing a boundary cell of a table from a plurality of body cell of said table; and (c2) classifying said boundary cell as supplemental information.

6. The computer controlled method of claim 4 wherein step (c) further comprises the steps of:

(c1) identifying an axis of a graph;

(c2) determining an axis related information; and (c3) classifying said axis related information as supplemental information.

7. The computer controlled method of claim 1 wherein said drawing area is within a context and step (c) further comprises the step of scrolling said selection of primary information within said drawing area without scrolling said context.

8. The computer controlled method of claim 1 wherein said drawing area is within a context and step (d) further comprises the steps of:

(d1) detecting a relevant edge of said primary information;

(d2) adjusting positions of said selection of primary information and said supplemental information within said drawing area; and (d3) scrolling said drawing area together with said context.

9. An information display system for automatically displaying structured information on a computer controlled display device to a user; said structured information including a plurality of primary information and a supplemental information; said system comprising:

a determination mechanism configured to determine that one or more but not all of said plurality of primary information is to be presented on said display device to said user; said plurality of primary information having an attached edge relating to said supplemental information;

a detection mechanism configured to locate said supplemental information within said structured information; and a display mechanism configured to display a selection of primary information and said supplemental information within a drawing area on said display device; said supplemental information positioned within said drawing area dependent on said attached edge; said supplemental information corresponding to said selection of primary information; and said selection of primary information comprising one or more of said plurality of primary information.

10. The information display system of claim 9 wherein said detection mechanism comprises an explicit specification detection mechanism configured to detect a supplemental information designation explicitly identifying said supplemental information within said structured information.

11. The information display system of claim 10 wherein said supplemental information designation is specified according to a document markup language.

12. The information display system of claim 9 wherein said detection mechanism comprises a heuristic supplemental information detection mechanism configured to heuristically locate said supplemental information within said structured information.

13. The information display system of claim 12 wherein said heuristic supplemental information detection mechanism further comprises:

a comparison mechanism configured to distinguish a boundary cell of a table from a plurality of body cells of said table; and a classification mechanism configured to classify said boundary cell as supplemental information.

14. The information display system of claim 12 wherein said heuristic supplemental information detection mechanism further comprises:

an axis location mechanism configured to locate an axis of a graph;

a determination mechanism configured to determine an axis related information associated with said axis; and a classification mechanism configured to classify said axis related information as supplemental information.

15. The information display system of claim 9 wherein said drawing area is within a context and said display mechanism further comprises a scrolling mechanism configured to scroll said selection of primary information within said drawing area without scrolling said context.

16. The information display system of claim 9 wherein said drawing area is within a context and said display mechanism further comprises:
- a detection mechanism configured to detect a relevant edge of said primary information;
- an adjustment mechanism configured to adjust positions of said selection of primary information and said supplemental information within said drawing area dependent on said relevant edge; and
- a scroll mechanism configured to scroll said drawing area together with said context.

17. An information display apparatus for automatically displaying structured information on a display device to a user; said information display apparatus having a central processing unit (CPU), a memory, and said display device; said structured information including a plurality of primary information and a supplemental information; said display apparatus comprising:
- a determination mechanism configured to determine that one or more but not all of said plurality of primary information is to be presented on said display device to said user; said plurality of primary information having an attached edge relating to said supplemental information;
- a detection mechanism configured to locate said supplemental information within said structured information; and
- a display mechanism configured to display a selection of primary information and said supplemental information within a drawing area on said display device; said supplemental information positioned within said drawing area dependent on said attached edge; said supplemental information corresponding to said selection of primary information; and said selection of primary information comprising one or more of said plurality of primary information.

18. The information display apparatus of claim 17 wherein said detection mechanism comprises an explicit specification detection mechanism configured to detect a supplemental information designation explicitly identifying said supplemental information within said structured information.

19. The information display apparatus of claim 18 wherein said supplemental information designation is specified according to a document markup language.

20. The information display apparatus of claim 17 wherein said detection mechanism comprises a heuristic supplemental information detection mechanism configured to heuristically locate said supplemental information within said structured information.

21. The information display apparatus of claim 20 wherein said heuristic supplemental information detection mechanism further comprises:
- a comparison mechanism configured to distinguish a boundary cell of a table from a plurality of body cells of said table; and
- a classification mechanism configured to classify said boundary cell as supplemental information.

22. The information display apparatus of claim 20 wherein said heuristic supplemental information detection mechanism further comprises:
- an axis location mechanism configured to locate an axis of a graph;
- a determination mechanism configured to determine an axis related information associated with said axis; and
- a classification mechanism configured to classify said axis related information as supplemental information.

23. The information display apparatus of claim 17 wherein said drawing area is within a context and said display mechanism further comprises a scrolling mechanism configured to scroll said selection of primary information within said drawing area without scrolling said context.

24. The information display apparatus of claim 17 wherein said drawing area is within a context and said display mechanism further comprises:
- a detection mechanism configured to detect a relevant edge of said primary information;
- an adjustment mechanism configured to adjust positions of said selection of primary information and said supplemental information within said drawing area dependent on said relevant edge; and
- a scroll mechanism configured to scroll said drawing area together with said context.

25. A computer program product for causing a computer to automatically display structured information of a display device to a user, said structured information including a plurality of primary information and a supplemental information, comprising:
- a computer usable storage medium;
- computer controlling instructions, stored on said storage medium, to cause said computer to effect a determination mechanism configured to determine that one or more but not all of said plurality of primary information is to be presented on said display device to said user, said plurality of primary information having an attached edge relating to said supplemental information;
- computer controlling instructions, stored on said storage medium, to cause said computer to effect a detection mechanism configured to locate said supplemental information within said structured information; and
- computer controlling instructions, stored on said storage medium, to cause said computer to effect a display mechanism configured to display a selection of primary information and said supplemental information within a drawing area on said display device, said supplemental information positioned within said drawing area dependent on said attached edge, said supplemental information corresponding to said selection of primary information, and said selection of primary information comprising one or more of said plurality of primary information.

26. The computer program product of claim 25 wherein said detection mechanism comprises an explicit specification detection mechanism configured to detect a supplemental information designation explicitly identifying said supplemental information within said structured information.

27. The computer program product of claim 26 wherein said supplemental information designation is specified according to a document markup language.

28. The computer program product of claim 25 wherein said detection mechanism comprises a heuristic supplemental information detection mechanism configured to heuristically locate said supplemental information within said structured information.

29. The computer program product of claim 28 wherein said heuristic supplemental information detection mechanism further comprises:
- a comparison mechanism configured to distinguish a boundary cell of a table from a plurality of body cells of said table; and a classification mechanism configured to classify said boundary cell as supplemental information.

30. The computer program product of claim 28 wherein said heuristic supplemental information detection mechanism further comprises:

an axis location mechanism configured to locate an axis of a graph;

a determination mechanism configured to determine an axis related information associated with said axis; and a classification mechanism configured to classify said axis related information as supplemental information.

31. The computer program product of claim 25 wherein said drawing area is within a context and said display mechanism further comprises a scrolling mechanism configured to scroll said selection of primary information within said drawing area without scrolling said context.

32. The computer program product of claim 25 wherein said drawing area is within a context and said display mechanism further comprises:

a detection mechanism configured to detect a relevant edge of said primary information;

an adjustment mechanism configured to adjust positions of said selection of primary information and said supplemental information within said drawing area dependent on said relevant edge; and a scroll mechanism configured to scroll said drawing area together with said context.

\* \* \* \* \*

UNITED STATES PATENT AND TRADEMARK OFFICE
CERTIFICATE OF CORRECTION

Figure 2B:
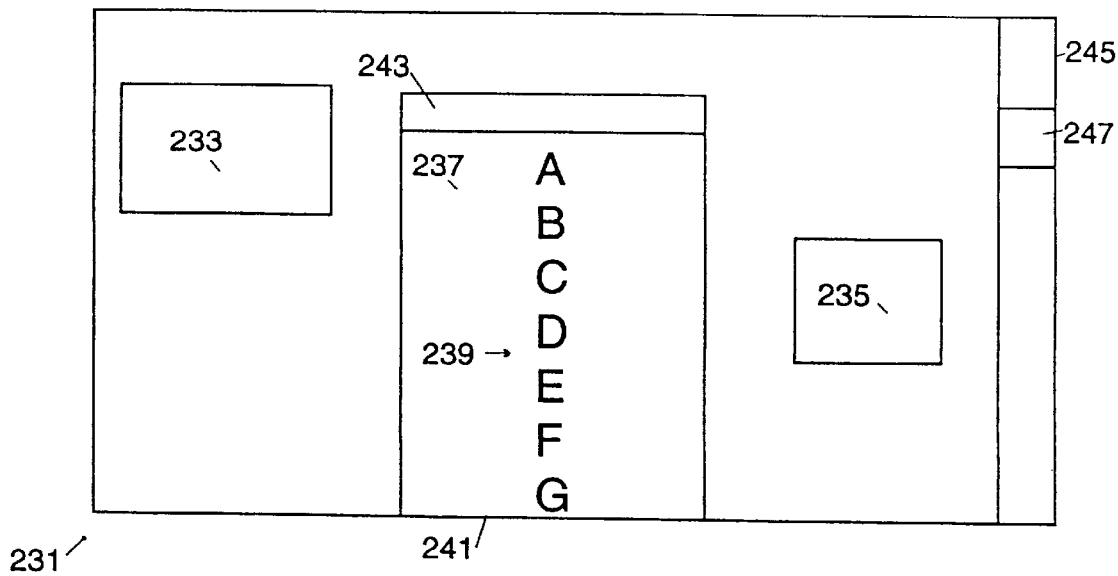
Figure 2C:
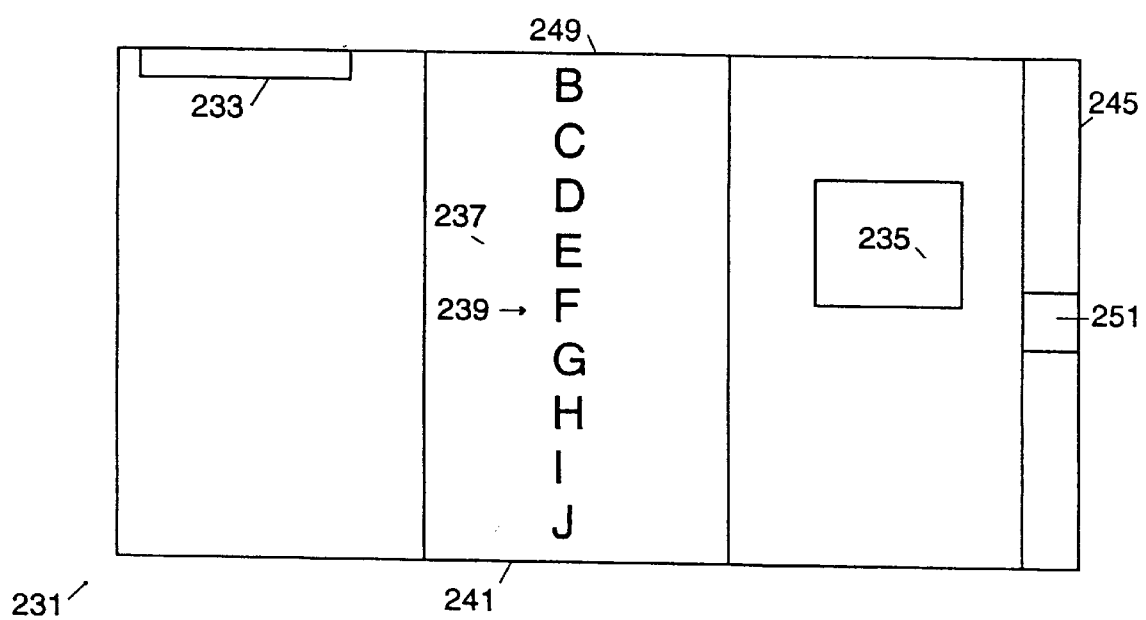
Figure 2D:
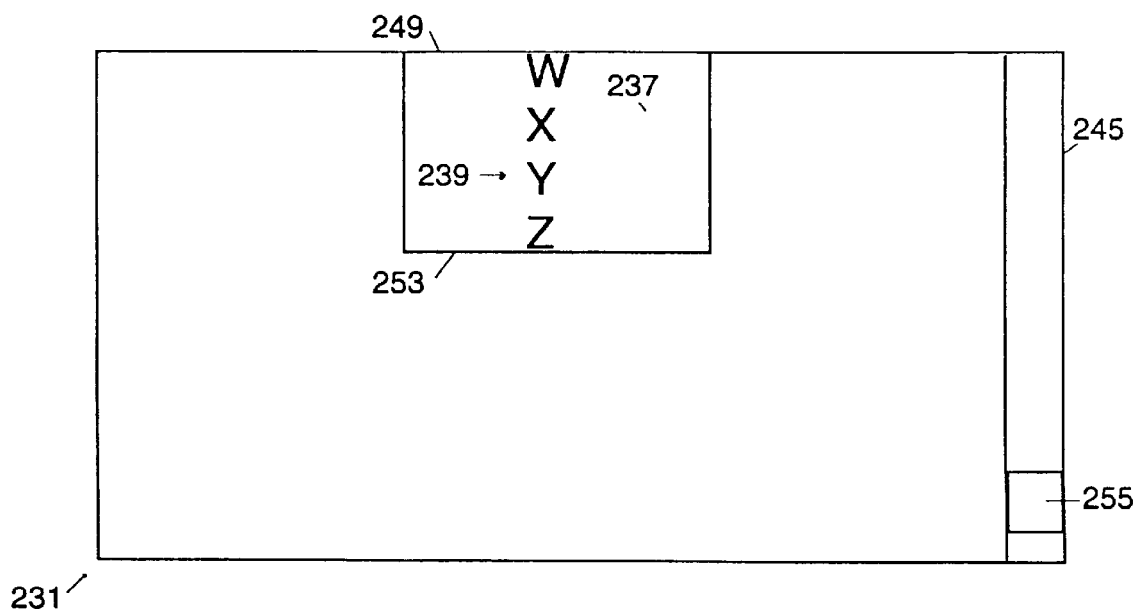

PATENT NO. : 6,199,080 B1 Page 1 of 1
DATED : March 6, 2001
INVENTOR(S) : Jakob Nielsen It is certified that error appears in the above-identified patent and that said Letters Patent is hereby corrected as shown below:

<u>Column 7,</u>
Line 60, "FIGS. 2a-d" should read -- FIGS. 2a(1)-2a(3) and 2b-2d --.

<u>Column 8,</u>
Line 24, "FIGS. 13a-e" should read -- FIGS. 13a(1)-13a(3) and 13b-13e --.

Signed and Sealed this

Twentieth Day of April, 2004

JON W. DUDAS
*Acting Director of the United States Patent and Trademark Office*